US012356053B2

(12) United States Patent
Potetsianakis et al.

(10) Patent No.: US 12,356,053 B2
(45) Date of Patent: Jul. 8, 2025

(54) MULTI-VIEW VIDEO STREAMING

(71) Applicants: Koninklijke KPN N.V., Rotterdam (NL); Nederlandse Organisatie Voor Toegepast-Natuurwetenschappelijk Onderzoek TNO, 's-Gravenhage (NL)

(72) Inventors: Emmanouil Potetsianakis, The Hague (NL); Emmanuel Thomas, Delft (NL)

(73) Assignees: Koninklijke KPN N.V., Rotterdam (NL); Nederlandse Organisatie Voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 131 days.

(21) Appl. No.: 18/259,540

(22) PCT Filed: Dec. 22, 2021

(86) PCT No.: PCT/EP2021/087379
§ 371 (c)(1),
(2) Date: Jun. 27, 2023

(87) PCT Pub. No.: WO2022/144284
PCT Pub. Date: Jul. 7, 2022

(65) Prior Publication Data
US 2023/0379554 A1 Nov. 23, 2023

(30) Foreign Application Priority Data
Dec. 31, 2020 (EP) .................................... 20218001

(51) Int. Cl.
*H04N 21/218* (2011.01)
*H04N 21/437* (2011.01)
*H04N 21/81* (2011.01)

(52) U.S. Cl.
CPC ..... *H04N 21/816* (2013.01); *H04N 21/21805* (2013.01); *H04N 21/437* (2013.01)

(58) Field of Classification Search
None
See application file for complete search history.

(56) References Cited

U.S. PATENT DOCUMENTS

| 8,633,964 | B1 | 1/2014 | Zhu | |
| 8,806,050 | B2 * | 8/2014 | Chen | H04L 65/756 |
| | | | | 709/227 |

(Continued)

FOREIGN PATENT DOCUMENTS

| CN | 110463211 A | * 11/2019 | ............. H04H 20/95 |
| JP | 2010530702 A | * 9/2010 | ........... H04N 13/161 |

(Continued)

OTHER PUBLICATIONS

Blinder, et al., "Signal Processing Challenges for Digital Holographic Video Display Systems," Signal Processing: Image Communication: 70 (2019) 114-130.

(Continued)

*Primary Examiner* — William J Kim
(74) *Attorney, Agent, or Firm* — Hamilton, Brook, Smith & Reynolds, P.C.

(57) ABSTRACT

A method of processing a multi-view video by a client apparatus is described wherein, the multi-view video comprising a set of video streams is created by a set of cameras simultaneously capturing an object in a scene for a set of view angles and for one or more video resolutions, each video stream defining a view associated with a view angle of a camera relative to the object. The method may comprise: receiving a manifest file defining a plurality of windows for the multi-view video, a first window of the plurality of windows defining a first subset of video streams selected from the set of video streams, the first subset of video streams being associated with a first subset of view angles of the set of view angles; determining position information associated with an angular position of a viewer relative to a (Continued)

multi-view display apparatus, the multi-view display apparatus being configured to render the multi-view video identified in the manifest file; selecting the first window from the plurality of windows based on the position information and the first subset of view angles and requesting transmission of the first subset of video streams by a server system; and, receiving multi-view video data associated with the first subset of video streams; and, providing the multi-view video data to a decoder apparatus for decoding.

27 Claims, 10 Drawing Sheets

(56) References Cited

U.S. PATENT DOCUMENTS

| | | | | |
|---|---|---|---|---|
| 2004/0066555 | A1* | 4/2004 | Nomura | H04N 13/275 359/462 |
| 2012/0257018 | A1* | 10/2012 | Shigemura | G02B 30/27 348/46 |
| 2016/0253795 | A1* | 9/2016 | Cole | G06T 11/40 345/426 |
| 2016/0269794 | A1 | 9/2016 | Shimura et al. | |
| 2017/0237965 | A1* | 8/2017 | Wang | H04N 21/85406 348/42 |
| 2017/0337711 | A1* | 11/2017 | Ratner | H04N 19/119 |
| 2018/0220166 | A1 | 8/2018 | Meyer | |
| 2018/0343472 | A1* | 11/2018 | Wang | H04N 21/85406 |
| 2019/0020880 | A1* | 1/2019 | Wang | H04L 65/612 |
| 2019/0041728 | A1* | 2/2019 | Vasudev | F16M 13/022 |
| 2019/0068946 | A1* | 2/2019 | Stockhammer | H04N 21/816 |
| 2019/0104326 | A1 | 4/2019 | Stockhammer et al. | |
| 2020/0177809 | A1 | 6/2020 | Hannuksela | |
| 2020/0236406 | A1 | 7/2020 | Bastian et al. | |
| 2021/0006614 | A1* | 1/2021 | Oyman | H04L 65/756 |
| 2021/0029386 | A1* | 1/2021 | Hamada | H04N 21/233 |
| 2021/0127144 | A1* | 4/2021 | Deshpande | H04N 21/235 |
| 2021/0195263 | A1 | 6/2021 | Garcia et al. | |
| 2021/0409670 | A1 | 12/2021 | Oh et al. | |
| 2022/0078486 | A1* | 3/2022 | Hannuksela | H04N 21/8456 |
| 2024/0080501 | A1 | 3/2024 | Brandt et al. | |

FOREIGN PATENT DOCUMENTS

| | | | | |
|---|---|---|---|---|
| WO | WO-2018162509 | A2 * | 9/2018 | G06F 3/011 |
| WO | WO-2018179843 | A1 * | 10/2018 | H04H 20/95 |
| WO | WO-2019187442 | A1 * | 10/2019 | H04N 13/111 |
| WO | 2020/198164 | A1 | 10/2020 | |
| WO | 2022144302 | A1 | 7/2022 | |

OTHER PUBLICATIONS

Extended European Search Report, issued for EP Application No. 20218001.4, entitled "Multi-View Video Streaming," dated May 31, 2021.

International Search Report and the Written Opinion, issued for International Application No. PCT/EP2021/087379, entitled "Multi-View Video Streaming," dated Apr. 7, 2022.

Chen, S. E., et al., "View Interpolation for Image Synthesis", Proceedings of the 20th Annual Conference on Computer Graphics and Interactive Techniques, 1993, 10 pages.

Ozcinar, C., et al., "Dynamic adaptive 3D multi-view video streaming over the internet", '13 proceedings of the 2013 ACM International Work Shop on Immersive Media experiences, Oct. 2013, pp. 51-56.

* cited by examiner

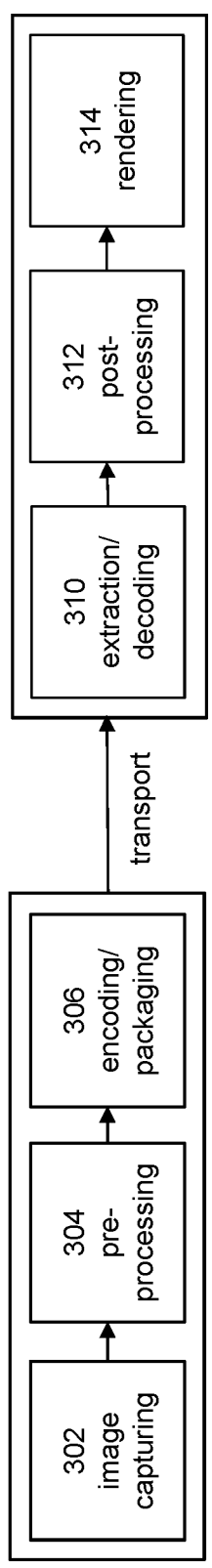
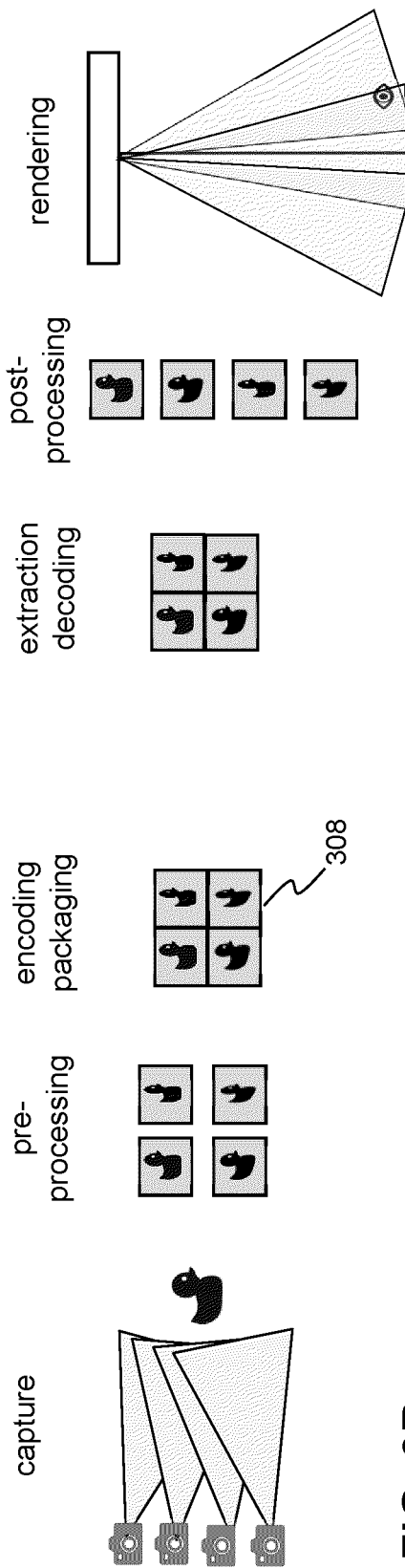
FIG. 3A
FIG. 3B

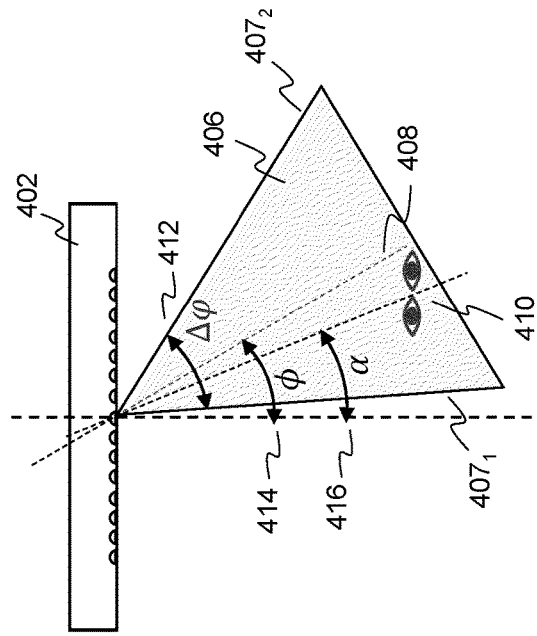
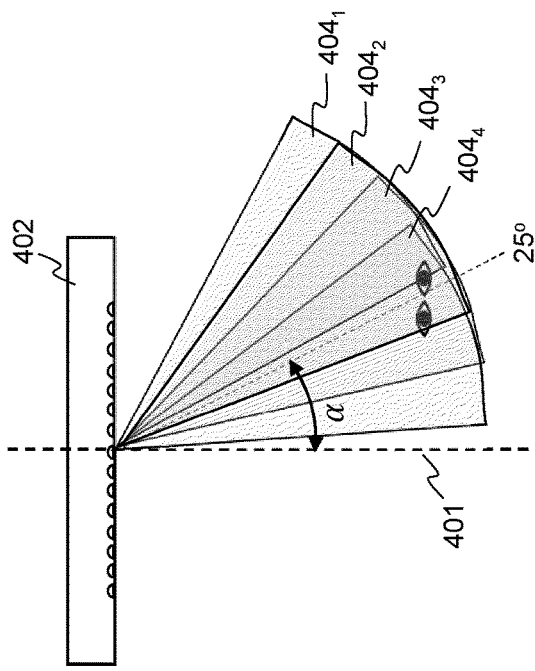
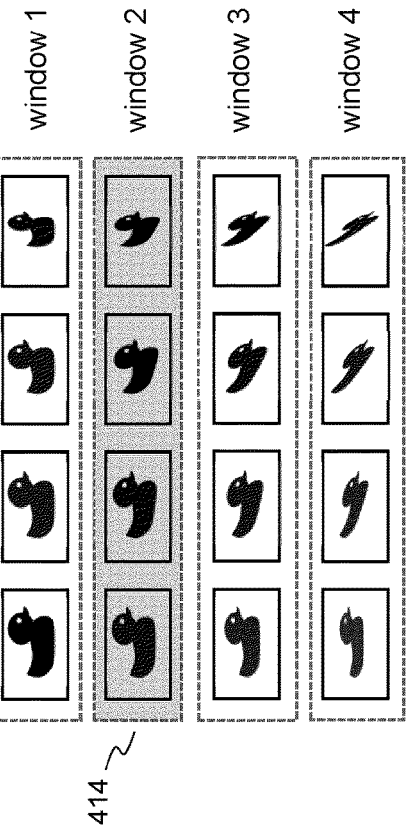
FIG. 4B
FIG. 4A
FIG. 4C

MULTI-VIEW VIDEO STREAMING

This application is the U.S. National Stage of International Application No. PCT/EP2021/087379, filed Dec. 22, 2021, which designates the U.S., published in English, and claims priority under 35 U.S.C. § 119 or 365(c) to European Application No. 20218001.4, filed Dec. 31, 2020. The entire teachings of the above applications are incorporated herein by reference.

FIELD OF THE INVENTION

The invention relates to multi-view video streaming, and, in particular, though not exclusively, to methods and systems for streaming of multi-view video to a multi-view display, a client and a server for streaming multi-view video, a content creation system for creating a multi-view video format, and a computer program product for executing such methods.

BACKGROUND OF THE INVENTION

Currently new classes of 3D video displays are being developed that provide a true 3D holographic experience without the need of special glasses, e.g. polarization glasses. An overview of these displays is provided in the article by Blinder et al, *Signal processing challenges for digital holographic video display systems*, Signal processing: image communication 70 (2019) p. 114-130. These displays include special optics that produce different visual information depending on the viewer's eye position and gaze with respect to the screen. The content consumed by such displays may be generated by capturing a scene with objects using cameras with slight viewing angle displacements while focusing on the same scene. A sequence of video frames generated by each of the cameras is generally referred to as a "view" and the video content for such 3D displays that is produced on the basis of views is referred to as multi-view video. To produce the 3D effect, at least a number of views need to be processed and rendered simultaneously by the display.

As a simple example, well known auto-stereoscopy displays uses views captured from two cameras in distance similar to the distance of an eye pair, with both cameras focusing on the same subject. Due to the uniform type of cameras, their proximity and their singular focus the context of each stream is identical, and the content has significant (visual) similarities between each stream. Typically, the 3D effect of auto-stereoscopic displays is poor because of the limited information that is encoded in the two images. More realistic "holographic" effects can be achieved using displays that are capable of simultaneously rendering a large number of views wherein the angular sampling pitch of the different views is small enough so that multiple rays emanating from the same screen point of the display enter the viewer's pupils.

Examples of such state-of-the-art displays include multi-view displays (sometimes rereferred to as light-field displays) and holographic displays. For example, the Looking-Glass display developed by the LookingGlass Factory uses an optical technology wherein depending on the user's viewing angle a different view reaches the eyes of the viewer. To achieve this effect, video frames of the multi-view video may include a plurality of views, e.g. 45 different views of an object. This way, multi-view video can be encoded based on a standard video codec and transmitted to a display using a standard video transport format. A decoder in the display may decode the video frames, extract different views, e.g. tens of different views, from each video frame and simultaneously render the views to produce the desired holographic effect.

To achieve realistic holographic video rendering, the angular resolution of the views still needs substantial improvement, requiring generation, encoding, transportation (streaming), decoding and simultaneous play-out of multi-view video comprising a large number of views. Streaming of such multi-view content will provide substantial challenges in terms of bandwidth utilisation and quality of services, because the human eye is very sensitive to errors during the rending of multi-view video.

Ozcinar et al, describe in their article *Dynamic Adaptive Multi-View Video streaming over the Internet*, ImmersiveMe '13: proceedings of the 2013 ACM international workshop on Immersive media experiences, October 2013, pp. 51-56, an HTTP based adaptative streaming process for streaming a 3D free-viewpoint video to clients. The authors describe a MPEG-DASH scheme for a 3D free-viewpoint-type multi-view video including dynamic view adaptation for rendering on a conventional auto-stereoscopic display. In a 3D free-viewpoint scheme, a user is able to navigate through a scene based on user control. To that end, multiple views and depth information are transmitted to the client. For a particular viewpoint, a conventional stereoscopic image is constructed based on two views.

To limit the total load on the network during streaming, the authors suggest that the number of views transmitted to the client can be adapted based on the available bandwidth, while Depth Image Based Rendering (DIBR) can be utilised at the client side to construct additional views. For that purpose, within an MPEG reference view synthesis scheme was developed, called View Synthesis Reference Software (VSRS). DIBR thus allows the reduction of the number of views that is transmitted. The proposed approach is to selectively request segments of a subset of views at the highest possible quality, and use DIBR to estimate undelivered views by the receiver based on the depth information so that a stereoscopic display can produce a stereoscopic effect.

The above-described steaming scheme based on dynamic view adaptation is however not suitable for modern 3D multi-view and holographic displays, which require a predetermined minimum number of views to achieve the holographic effect irrespective of bandwidth fluctuations. Additionally, relying on heavy computational processes (such as view synthesis) at the client side, does not provide a scalable solution for multi-view displays where the amount of views is increasing rapidly to a large number of views (e.g. 45 views with latest display from the LookingGlass Factory).

Hence, from the above, it follows there is need in the art for improved adaptive multi-view video streaming for multi-view displays. Additionally, there is a need for an adaptive multi-view video format that allows efficient streaming of multi-view video to multi-view displays under constrained resources, computation power, battery, transmission bandwidth, hardware video decoding capacities, etc.

SUMMARY OF THE INVENTION

As will be appreciated by one skilled in the art, aspects of the present invention may be embodied as a system, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the person's computer, partly on the person's computer, as a stand-alone software package, partly on the person's computer and partly on a remote computer, or entirely on the remote computer or server. In the latter scenario, the remote computer may be connected to the person's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In a first aspect, the invention relates a method of processing a multi-view video by a client apparatus. The multi-view video may be created based on a set of video streams, which are generated by a set of cameras simultaneously capturing an object in a scene for a set of view angles. A view angle may define an angle between an optical axis of the camera focused onto the object and a reference axis of the object.

In an embodiment, the method may comprise receiving metadata, preferably a manifest file, defining a plurality of windows for the multi-view video, wherein a window may define multi-view video data based on a subset of video streams selected from the set of video streams, the subset of video streams being associated with a subset of view angles, preferably the view angles of the subset of view angles defining an ordered sequence of view angles. The method may comprise determining or receiving position information associated with an angular position of a viewer, preferably the angular position being associated with the positions of eyes of the viewer, the angular position defining an angle between the reference axis of the object displayed by the multi-view display apparatus and an optical axis of the viewer looking towards the object. The method may further comprise selecting a first window from the plurality of windows, the first window being associated with a first subset of view angles, the selecting being based on the position information and the first subset of view angles. The method may further comprise requesting transmission of first multi-view video data associated with the first subset of video streams from a server system. Further, the method may comprise receiving the first multi-view video data, and, providing the first multi-view video data to at least one decoder instance for decoding.

Hence, the invention leverages the fact that a viewer only sees a subset of all the views displayed by a multi-view display at any given point in time. Therefore, the invention aims at efficient delivery of the views that are visible to the viewer. To that end, a multi-view video format for a streaming client is defined wherein the data format includes a set of views needed for a certain angular position of the viewer with respect to the multi-view display. From all the available views, a set of contiguous views is bundled into a so-called "window" format. A window comprises multi-view video data containing those contiguous views. The invention allows a streaming client to request multi-view video data, e.g. a set of video streams associated with different view angles, based on the position, in particular the angular position of a viewer that uses the streaming client. The multi-view video data may be decoded into pictures associated with different view angles which may be simultaneously rendered by the multi-view display so that the user will experience a 'holographic' effect.

In an embodiment, the first multi-view video data may include a sequence of encoded multi-view pictures, each multi-view picture including pictures associated with all view angles of the first subset of view angles. In this embodiment, all pictures of all view angles of the first window are spatially arranged in a multi-view picture. This way, the pictures of all view angles are by design time synchronized.

In an embodiment, the first multi-view video data may include groups of pictures, a group of pictures comprising pictures for all view angles of the first subset of view angles for a time instance. In this embodiment, pictures associated with a view angle may be streamed as a separate stream of pictures to a client device.

In an embodiment, each multi-view picture may be associated with a packing format, the packing format defining how the pictures associated with the first subset of view angles are spatially arranged in the multi-view picture.

In an embodiment, the method may further include: decoding the first multi-view video data into first decoded pictures associated with the first subset of view angles; and, providing the first decoded pictures to the multi-view display apparatus for simultaneously rendering at least part of the first decoded pictures to provide a holographic effect at the position of the viewer.

In an embodiment, the position information may be determined by or provided by a position sensor, which is configured to compute or predict the angular position of the viewer. In an embodiment, the position sensor may include an imaging system configured to track the position of the viewer in images captured by the imaging system.

In an embodiment, the selecting the first window from the plurality of windows may include: determining if the angular position of the viewer is located within a range defined by the smallest and the largest view angles of the first subset of view angles. Hence, a suitable window can be efficiently selected by comparing the angular position of the viewer with the subset of view angles defined by the window.

In an embodiment, the ordered sequence of view angles may define an increasing or decreasing sequence of view angles, wherein a difference between two subsequent view angles defines a view spacing.

In an embodiment, the view spacing of the different views may be selected so that, during the rendering of the multi-view pictures, different visual information associated with different multiple view angles emanating from a screen point of the display apparatus enter the left and right eye of the viewer.

In an embodiment, the metadata may further comprise first resource locators for locating the server system that is configured to transmit one or more resolution versions of the first subset of video streams to the client apparatus.

In an embodiment, one window of the plurality of windows may define a second window, wherein the second window defines a second subset of video streams selected from the set of video streams, the second subset of video streams being associated with a second subset of view angles wherein.

In an embodiment, the view angles of the first subset may partly overlap with the view angles of the second subset.

In an embodiment, the view angles of the first subset do not overlap with the view angles of the second subset.

In an embodiment, the view angles of the first subset may be identical to the view angles of the second subset and the number of video streams of the first subset is larger than the number of video streams of the second subset.

In an embodiment, the metadata, preferably the manifest file, includes at least one of:
metadata defining that the first subset of view angles define: horizontal view angles for horizontal multi-view video rendering; vertical view angles for vertical multi-view video rendering; or, horizontal and vertical view angles for both horizontal and vertical multi-view video rendering;
metadata defining a data format of the multi-view pictures;
metadata defining an order in which pictures of different view angles are spatially arranged in the multi-view picture;
metadata defining one or more properties of the set of cameras used to create the set of video streams.
metadata defining the first angle of the first subset and/or the last angle of the first subset;
metadata defining the number of view angles in the first subset;

In an embodiment, the client apparatus may be implemented as an HTTP adaptive streaming client apparatus, such as a MPEG-DASH client apparatus, and wherein the manifest file defines a Media Presentation Description (MPD), wherein the MPD includes a first windows descriptor defining the first window, preferably the first windows descriptor being an EssentialProperty, more preferably the first window being mapped to a first AdaptationSet, the EssentialProperty of the first AdaptationSet comprising the first window descriptor, the first AdaptationSet comprising Representations wherein each Representation defines one quality version of a video stream of the first subset of video streams.

In an aspect, the invention may relate to a method of processing a multi-view video by a multi-view video authoring system. In an embodiment, the method may include receiving a set of video streams defining a multi-view video, the multi-video being generated by a set of cameras simultaneously capturing an object in a scene for a set of view angles, a view angle defining an angle between an optical axis of the camera focused onto the object and a reference axis of the object. The method may further include selecting a first subset and a second subset of video streams from the set of video streams, the first subset and the second subset of video streams being associated with a first subset of view angles and a second subset of view angles respectively. The method may include determining first multi-view video data associated with the first subset of video streams and second multi-view video data associated with the second subset of video streams. The method may also include determining a manifest file, the manifest file defining a first window and a second window for the multi-view video, wherein the first window defines the first multi-view video data associated with the first subset of video streams and the first subset of view angles and the second window defines the second multi-view video data associated with the second subset of video data and the second subset of view angles; and, the method may include storing the first and the second multi-view video data and the manifest file on a storage medium.

In an embodiment, the determining first multi-view video data may include:

spatially arranging pictures of all view angles of the first subset into multi-view pictures; and, encoding the multi-view pictures based on a video coding process.

In a yet a further aspect, the invention may relate to a client apparatus for processing multi-view video, the multi-view video being created based on a set of video streams, which are generated by a set of cameras simultaneously capturing an object in a scene for a set of view angles, a view angle defining an angle between an optical axis of the camera focused onto the object and a reference axis of the object. In an embodiment, the client apparatus may comprise a computer readable storage medium having computer readable program code embodied therewith, and a processor, preferably a microprocessor, coupled to the computer readable storage medium, wherein responsive to executing the computer readable program code. In an embodiment, the processor may be configured to perform executable operations comprising at least one of: receiving metadata, preferably a manifest file, defining a plurality of windows for the multi-view video, a window defining multi-view video data based on a subset of video streams selected from the set of video streams, the subset of video streams being associated with a subset of view angles, preferably the view angles of the subset of view angles defining an ordered sequence of view angles; determining or receiving position information associated with an angular position of a viewer, preferably the angular position being associated with the positions of eyes of the viewer, the angular position defining an angle between the reference axis of the object displayed by the multi-view display apparatus and an optical axis of the viewer looking towards the object;

selecting a first window from the plurality of windows, the first window being associated with a first subset of view angles, the selecting being based on the position information and the first subset of view angles; requesting transmission of first multi-view video data associated with the first subset of video streams from a server system; receiving the first multi-view video data, and, providing the first multi-view video data to at least one decoder instance for decoding.

The invention may also relate to a client apparatus for processing multi-view video configured to perform any of the method steps defined by the embodiments described above.

In a further aspect, the invention may relate to a multi-view video authoring system comprising: a computer readable storage medium having computer readable program code embodied therewith, and a processor, preferably a microprocessor, coupled to the computer readable storage medium, wherein responsive to executing the computer readable program code, the processor is configured to perform executable operations comprising: receiving a set of video streams defining a multi-view video, the multi-video being generated by a set of cameras simultaneously capturing an object in a scene for a set of view angles, a view angle defining an angle between an optical axis of the camera focused onto the object and a reference axis of the object; selecting a first subset and a second subset of video streams from the set of video streams, the first subset and the second subset of video streams being associated with a first subset of view angles and a second subset of view angles respectively; determining first multi-view video data associated with the first subset of video streams and second multi-view video data associated with the second subset of video streams; determining a manifest file, the manifest file defining a first window and a second window for the multi-view video, wherein the first window defines the first multi-view video data associated with the first subset of video streams and the first subset of view angles and the second window defines the second multi-view video data associated with the second subset of video data and the second subset of view angles; and, storing the first and the second multi-view video data and the manifest file on a storage medium.

In an aspect, the invention may relate to a server for processing multi-view video, the server comprising: a storage medium having multi-view video stored thereon, the multi-view video including: first multi-view video data associated with the a first subset of video streams and first subset of view angles and second multi-view video data associated with a second subset of video streams and a second subset of view angles, the first multi-view video data defining a first window for the multi-view video and the second multi-view video data defining a second window for the multi-view video; the first and the second subset of video streams being selected from a set of video streams, which are generated by a set of cameras simultaneously capturing an object in a scene for a set of view angles, a view angle defining an angle between an optical axis of the camera focused onto the object and a reference axis of the object; the storage medium further having computer readable program code embodied therewith, and a processor, preferably a microprocessor, coupled to the computer readable storage medium, wherein responsive to executing the computer readable program code, the processor is configured to perform executable operations comprising: receiving from a client apparatus a request for transmitting multi-view video data associated with at least one of the first and the second windows to the client apparatus; and, transmitting the at least one of the first and second multi-view video data to the client apparatus;

The invention may relate to a computer-readable medium comprising transitory or non-transitory data, the data defining a data structure, the data structure representing metadata defining a first and a second window for a multi-view video, the multi-view video comprising a set of video streams generated by a set of cameras simultaneously capturing an object in a scene for a set of view angles, a view angle defining an angle between an optical axis of the camera focused onto the object and a reference axis of the object, the data structure defining a first window defining first multi-view video data associated with a first subset of video streams and a first subset of view angles and the second window defining second multi-view video data associated with of a second subset of video streams and a second subset of view angles; the first and the second subset of video streams being selected from the set of video streams.

The invention may also relate to a computer program product comprising software code portions configured for, when run in the memory of a computer, executing the method steps according to any of process steps described above.

The invention will be further illustrated with reference to the attached drawings, which schematically will show embodiments according to the invention. It will be understood that the invention is not in any way restricted to these specific embodiments.

For example, streams in one window may typically have the same resolution. However, streams in a window may alternatively have different resolutions, for example views at the border of the window may have a lower resolution than views more central to the window. This may be advantageous when a user is moving, possibly moving to a new view faster than anticipated, and a second window is needed but not yet available. Having a first window, possibly a broader window, with streams at the border of the window in a lower resolution may thus provide a low resolution fall-back in such a scenario with a low additional bandwidth required for streaming the views at the border of the window. Such a window can then be used until a second window is available at the client apparatus that provides the view in a higher resolution.

As another example, the invention does not exclude that a window comprises further video streams that are not generated by cameras but generated e.g. based on interpolation of camera captured video streams.

BRIEF DESCRIPTION OF THE DRAWINGS

FIGS. 3A and 3B depicts a data processing pipeline for multi-view video according to an embodiment of the invention;

FIG. 4A-4C depict the concept of position-based multi-view video streaming according to an embodiment of the invention;

DETAILED DESCRIPTION

Figure 1B:
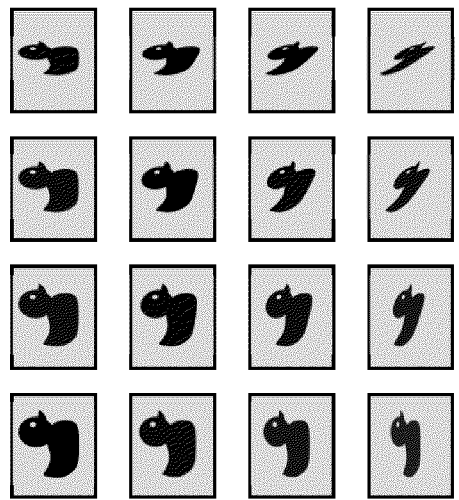
FIGS. 1A and 1B illustrate the creation of multi-view video.
Figure 1A:
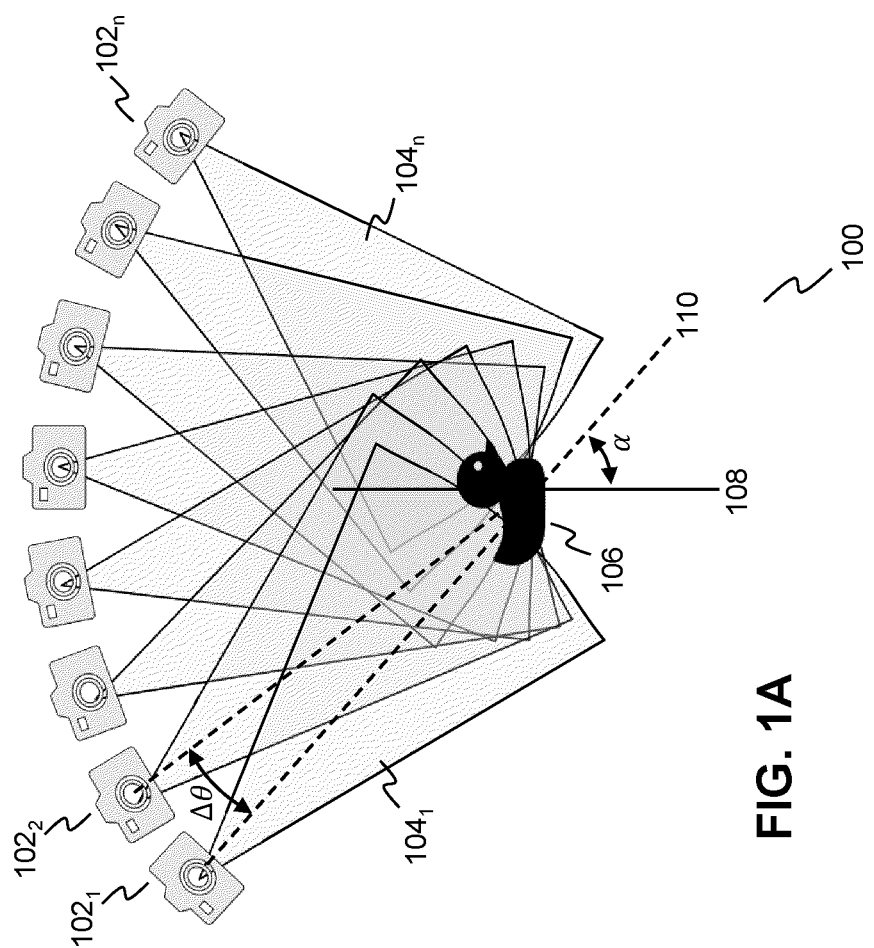

FIGS. 1A and 1B depict a schematic of a content creation system for multi-view video. As shown in FIG. 1A, a scene comprising one or more objects 106 may be captured by an array of similar cameras $102_{1-n}$ arranged around the object. The cameras may be equally spaced around the object and centered to the object to be captured. The cameras are arranged so that the object is within the field of view (FOV) $104_{1-n}$ of each camera, which—together with the front and back clipping plane form—the (3D) viewing frustrum of the camera. The cameras may be arranged in a curved formation around to object. Alternatively, the cameras may be arranged in a line. In the latter case however, there may be a slight tilt on the viewing frustrum of the cameras so that the object remains in focus for all cameras despite the displacement. In addition, the set of cameras needs to be carefully configured so that all the cameras capture the scene at the same number of images per second and that each image captured by each camera is taken at the same time instance. This is to ensure that the content captured is temporally coherent. If this condition is not met, this can cause visual artefacts and a degraded volumetric effect at the rendering.

The sequence of video frames captured by each camera may represent one "view" of the object. Hence, such sequence of video frames may hereafter be referred to as a view stream or simply a view. The common element between each view, is that the views have the same focal point and field of view and associated viewing angle (i.e the angle of the field of view), which conceptually matches the center of the display. Therefore, each view can be expressed as the deviation from a reference axis, which may be referred to as the view angle α. As shown in the figure, the view angle may be defined as the angle between the optical axis of a camera 110 focused onto the object and a reference axis 108 associated with the object (which conceptually defines the central axis of a multi-view display). This way, the view angle may be zero in case the optical axis of the camera is parallel to the central axis of the (virtual) multi-view display. The view angle may be defined in a suitable coordinate system.

Further, a view spacing Δθ may define the angular spacing between subsequent cameras—and thus—subsequent views. In order for the display to generate realist holographic effects, the angular view spacing should be sufficiently small. Depending on the application, the array of cameras may be a one-dimensional array of cameras as e.g. illustrated in FIG. 1A. In that case, views are available for different horizontal view angles. However, in other embodiments, the array of cameras may be a 2D array of cameras thereby not only generating side views of an object, but also views from 'above' and 'below'. In that case, the content creating system may generate a 2D grid of views as shown in FIG. 1B wherein each view may be associated with a particular (3D) view angle.

Figure 2:
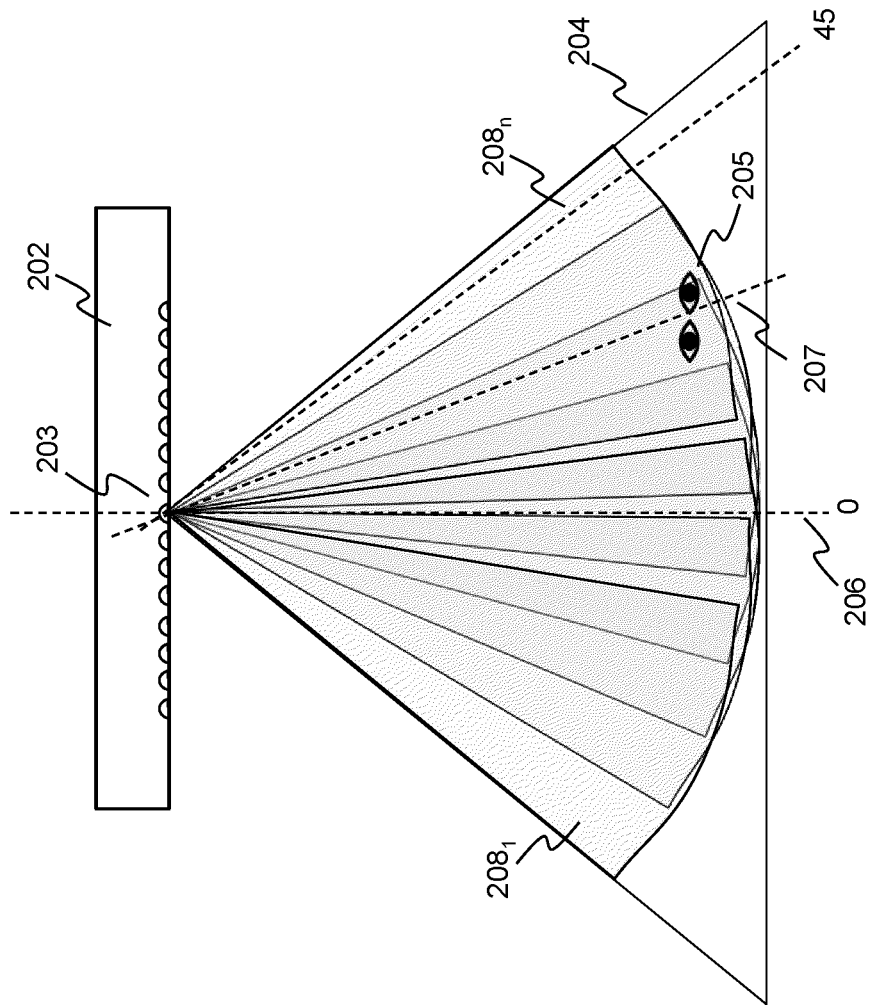
FIG. 2 illustrates the rendering of multi-view video by a multi-view display.

State of the art multi-view displays include special optics that display different visual information depending on the viewer's eye position and gaze. In particular, such displays are capable of simultaneously rendering multiple views so that realistic "holographic" effects may be achieved. To that end, the angular spacing of the different views should be small enough so that multiple rays emanating from the same screen point of the display enter the viewer's pupils. This is schematically shown in FIG. 2, which depicts a multi-view display apparatus comprising display screen 202 including screen points 203, pixel structures, which are configured to transmit different optical information associated with different views in different view angles.

For example, the figure depicts a pixel structure 203 at the central axis 206 of the display simultaneously emitting light of many different views $208_{1-n}$ in different view angles away from the screen. The envelope 204 of these views may define the field of view of the pixel structure, i.e. the area in which light emanating from the pixel structure is visible. All the pixel structures of the screen may form a display which emits different views at different view angles. The field of view of a pixel structure may be hardware dependent and may vary depending on the display technique that is used. Examples of such state-of-the-art displays include multi-view displays (sometimes rereferred to as light-field displays) and holographic displays. For example, the Looking-Glass display developed by the LookingGlass Factory uses an optical technology wherein depending on the user's viewing angle a different view reaches the eyes of the viewer.

Thus, a viewer 205 positioned at a predetermined angular position relative to the central axis of the display device will receive optical information from a different set of views than a viewer that is positioned at the central axis. Here, the angular position of the viewer may be defined by the angle between the reference axis of the object displayed by the multi-view display apparatus and the optical axis 207 of the viewer (the viewer axis) looking towards the object. Typically, the central axis of the display 206 will coincide with the reference axis of the displayed object and the viewer axis 207 may represent an imaginary axis which runs through the position of the viewer, in particular the eyes of the viewer, and the position of the pixel structure at the central axis of the display. This way, a viewer which is positioned away from the central axis will be able to see (part of) the side of an object, while the viewer at the central axis is not able to see that side. In practice, the number of simultaneously emitted views may be significantly larger than the number of views schematically depicted in FIG. 2. As shown in this picture, the visual information seen by the viewer 205 will consist of a subset of different views wherein the main part of the visual information will originate from views having view angles around the angular position of the viewer. The viewer will not receive any visual information from views having a view angle substantially larger or smaller than the angular position of the viewer. In other words, views that have a small angular distance with respect to the position of the viewer will be visible while views that have a large angular distance with respect to the angular position of the user are not visible to the viewer.

FIGS. 3A and 3B schematically depicts a full data processing pipeline for multi-view video. The process may include the step 302 of image capturing of one or more objects from different view angles based on an array of cameras as depicted e.g. described with reference to FIG. 1. It is noted that the video may relate to real scenes or virtual scenes (scenes for virtual reality or the like). Views associated with such virtual content may be generated based on a set of virtual cameras, in a similar way views based on real scenes are created.

In step 304 raw frames of the cameras may be processed to meet the multi-view content requirements. Examples of pre-processing that might be applied on this step include cropping, scaling, filtering etc. Depending on the targeted format(s) after a per-frame visual pre-processing step further a format-specific pre-processing step may be applied. For example, in an embodiment, pictures of different views of a one (single) time instance are encoded in one frame, the pictures may be stitched together and metadata may be generated describing at which position in the frame, a particular view is located.

In step 306, the composed video frames including the views may be encoded based on a video codec. Depending on the application, a different codec may be used, e.g. a traditional codec AVC, HEVC, AV1 or a multi-view codec such as the Multiview Video Coding (MVC) which is based the MPEG-4 part 10 AVC/H.264 codec. MVC is a codec standard for video compression that allows for the efficient encoding of video sequences captured simultaneously from multiple camera angles in a single video stream. One application is stereoscopic content, i.e. 2 views, (for 3D TV) but MVC also addresses multi-view content, i.e. more than 2 views. The algorithm uses a certain view as a base view which can be used to further predict the other views with techniques similar to inter-frame prediction.

Similarly, MV-HEVC is a video coding standard based on MPEG-H part 2/H.265 which allows for the efficient encoding of video sequences captured simultaneously from multiple camera angles in a single video stream. Further, a separate HEVC extension for stereoscopic content exists which is referred to as 3D-HEVC. Both extensions are published under the same specification number ISO/IEC 23008-2, i.e. MPEG-H part 2/H.265. Both standards are based on inter-frames dependencies. This includes dependencies in the time (as are traditional coding schemes) and between frames of different views. The encoded video may be packaged into a suitable transport or file container, e.g. an MPEG transport format or an ISO Base Media File Format (ISOBMFF).

After transport, the encoded video data may be extracted from the transport containers and decoded by a decoder (step 310). In some cases, the decoded frames may be post-processed based on the metadata, which may be received by the decoder in-band and out-of-band. For example, e.g. cropping operations may be needed to extract pictures from different views to form the decoded video frames. Finally, the pictures of the different views may be rendered by the multi-view display, which will simultaneously render the different views.

To achieve realistic holographic video rendering, the angular resolution of the views needs to be substantial, thereby requiring generation, encoding, transportation (streaming), decoding and simultaneous play-out of multi-view video comprising a large number of views. Streaming of such multi-view content will provide substantial challenges in terms of bandwidth utilisation and quality of services, because the human eye is very sensitive to errors during the rendering of multi-view video. Hence, a streaming scheme is needed that provides efficient data streaming while ensuring that the sufficient views are streamed so that the holographic effect can be created.

State of the art streaming techniques for stereoscopic multi-view video use adaptive streaming techniques such as Dynamic Adaptive Streaming over HTTP, such as MPEG-DASH, for streaming the video data to clients. These DASH schemes are based on dynamic view adaptation. Such approach is however not suitable for modern 3D multi-view and holographic displays, which require a substantial number of views to achieve the holographic effect irrespective of bandwidth fluctuations. Additionally, relying on heavy computational processes (such as view synthesis) at the client side, does not provide a scalable solution for multi-view displays where the number of views is increasing rapidly to a large number of views (i.e. about 45 views for state of the art display such as the 8K LookingGlass by the Looking-Glass Factory).

The embodiments in this application address these problems by introducing an adaptive streaming scheme for multi-view video that is based on the position of the viewer relative to the multi-view video display. As explained with reference to FIG. 2, a viewer watching visual information from the multi-view display will only be able to see as small part of all visual information transmitted by the pixel structures, wherein the part that is visible to the viewer depends on the position of the viewer relative to the multi-view display, for example relative to the central axis of the multi-view display. Hence, the visual information that is not visible to the viewer will occupy unnecessary bandwidth, which may be substantial when increasing the number of views transmitted by the pixel structures. To address this problem, when streaming multi-view video, a subset of all views is streamed to clients, wherein the subset of views relates to the views that are actually visible for the viewer. This way, a relatively large number of views around the angular position of the viewer can be used to produce a realistic holographic image for the user, without the need to stream all views to the client. This way, a substantial reduction in the bandwidth can be achieved. Additionally, in some embodiments, views not visible to a user may be downloaded in a low quality to cope with fast movements of a viewer in front of the display and/or a new viewer suddenly appearing at a side of the display.

FIG. 4A-4C depict the concept of position-based multi-view video streaming according to an embodiment of the invention. As shown in FIG. 4A, if the viewer of the multi-view display is at a particular angular position relative to a reference, e.g. the central (optical) axis 401 of the display, a streaming client may only request a subset of views, wherein the subset of view include the views that are visible for the viewer. Hence, given a certain angular position of the viewer relative to the display (determined by a viewer angle), only a predetermined number of views having view angles within a certain range of the viewer angle are provided by a streaming server to the multi-view streaming client. The views that are selected form a subset of the set of all views that are available for streaming to the client. The subset of views may be selected from the set of available views and their view spacing may be selected such that a sufficient number of contiguous views are transmitted to the streaming client so that a holographic effect in the direction where the user is positioned relative to the display can be realized by simultaneously rendering pictures of views of different view angles.

For example, as shown in FIG. 4A, in case the position of the viewer is at a viewer angle α of 25 degrees, only a subset of views $404_{1-4}$ of the total set of views may be requested so that a holographic image can be constructed by the multi-view display based on views that are visible to the viewer. To achieve such scheme, all available views of the multi-view video may be formatted into subsets of views, One or more of such subsets may be requested by the streaming client to produce (render) holographic video in one or more angular directions. A subset of views may be referred to as a window. Hence, a data format for the views may be defined as shown in FIG. 4C wherein subsets of views may be grouped together as windows. Each window, e.g. window 414, may include a certain number of views associated with a set of view angles. This range of view angles may define a subset within the set of view angles of the complete set of available views. The concept of windows as a subset of the whole set of available views may be used in a streaming protocol, for example an adaptative streaming protocol such as MPEG-DASH.

Instead of individually requesting views by a client, these views may be 'bundled' into windows and collectively requested based on metadata in e.g. a manifest file, which may define one or more windows and location information, e.g. resource locators and/or IP addresses, of one or more media servers in the network which are configured to transmit the views of a window upon request of a streaming client. Thus, in case the four views (as depicted in FIG. 4A) define a window, a client may just request a window (e.g. as an adaptation set of a DASH-based manifest file) which defines a number of views covering a certain angular space of the total viewing space of all views.

As shown in FIG. 4B, the area covered by a window is schematically illustrated by the triangular-shaped envelope 406 of the individual views that define a window. This area may be referred to as the viewing area or viewing space. During rendering of the views, the holographic effects will be visible for a viewer positioned in the viewing space, wherein the position of the viewer 410, may be defined by at angular position α 416. A skilled person will be appreciated that the viewing space depicted in FIG. 4B is merely a schematic to illustrate the concept of a window and that the true shape of the viewing space may depend on the hardware, the views and the number of views rendered. For example, in case of horizontal views (produced by a 1D array of cameras), the viewing space will be a 2D area, e.g. part of a circle. In case of both horizontal and vertical views (produced by a 2D array of cameras) then the viewing space may be defined as a 3D space, which is sometimes also referred to as a frustum.

As shown in the figure, in some embodiments, a 2D viewing space may be characterized by an (angular) window width Δφ 412 and an (angular) central window angle φ 414 relative to the central axis of the display. Here, the central viewing angle of a window may be defined as the angle between the perpendicular bisection 408 of the viewing space and the central axis of the multi-view display. Further, the window width can be defined as the difference between the angular positions of the first and second sides $407_{1,2}$ of the viewing space of the window. The window may be further characterized by the number of views defined by the window. The number of views and the window width may define the view spacing Δθ, i.e. the angular distance between two subsequent views (as described with reference to FIG. 1A).

Figure 5:
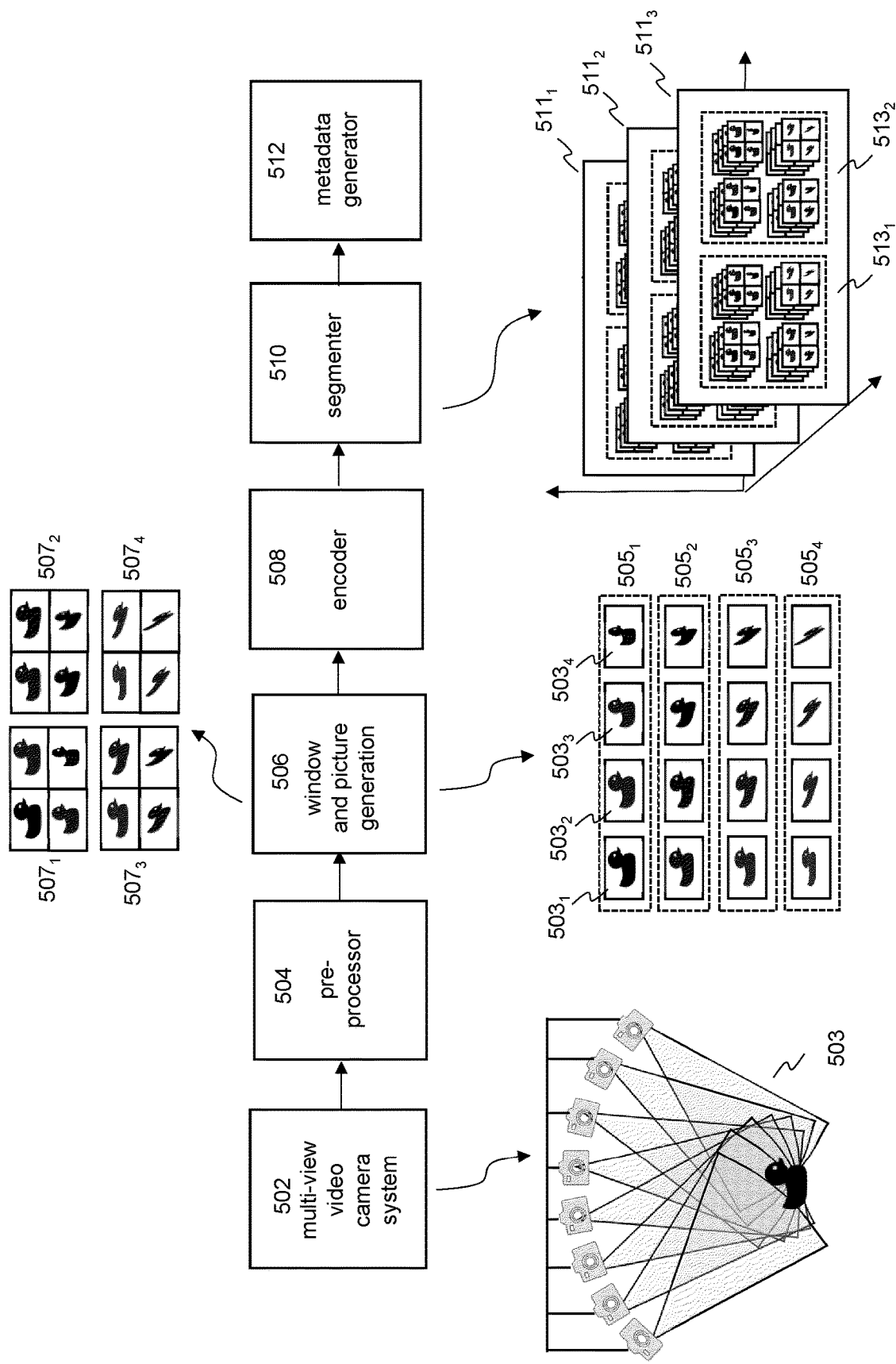
FIG. 5 illustrates the creation of a multi-view video data format according to an embodiment of the invention.

FIG. 5 depicts a schematic for creating and storing a multi-view video data format for position-based adaptive streaming according to an embodiment of the invention. As shown in the figure, a multi-view content creation system 502 may be configured to generate a set of video streams that may be created by simultaneously capturing an object in the scene for a range of view angles, wherein number of views and the range of view angles are selected such that the angular spacing of the different views is small enough so that multiple views emanating from the same screen point of the display enter the viewer's pupil. This way, each eye will receive more than one view at a time and, preferably the left eye will receive partly different views than the right eye. Further, all cameras capture the scene at the same number of images per second and that each image captured by each camera is taken at the same time instance. This is to ensure that the content captured is temporally coherent.

Here, each video stream may define a view associated with a view angle. During the generation of the video streams, metadata for identifying the video stream, e.g. resource locators, may be generated. The metadata may further include the number of views, the view angle associated with each view, and any other information associated with the video streams, e.g. image quality, camera parameters e.g. field of view of the camera, etc. The video streams and the associated metadata may define a multi-view video.

After capturing of the video streams, the video data may be processed by a multi-view video data processing system, e.g. a server system, which may include an image processor 504, a window generator 506, an encoder 508, a segmenter 510 and a metadata generator 512. The data processing pipeline may start with pre-processing the video data by a image data processor 504. For example, due to small displacements in the spatial alignment of the cameras, the resulting video frames may be cropped in order for them to have a common central point of interest. Other techniques that may be applied here may include interpolation (to generate intermediate views), stitching (if a view is composed by more than one camera), lighting adjustments, filtering, etc.

The views may then be provided to a window selector 506, which is configured to select different subsets of views from the full set of views and to create a multi-view window data format that can be used in a streaming protocol. The selection of the subsets may be based on different criteria, which may depend on the type of multi-view display, the application and/or the use case. In an embodiment, views generated by one or more rows and/or columns of a 2D grid-like camera array and metadata associated with the selected views may be selected to form a window. The views are a subset of the total number of views and the view angles of the subset define a subset of the total set of view angles that are available.

For example, as depicted in FIG. 5, a window generator may select multiple views from a grid of views generated by a 2D grid of cameras. For horizontal holographic multi-view rendering multiple horizontal views $504_{1-4}$ may be selected and formatted into windows from a 2D full set of views to define windows $504_{1-4}$, which can be defined by metadata, including for example a window width $\Delta\varphi$, a central window angle $\varphi$, the number of views and/or the view spacing $\Delta\theta$ of the views associated with the window, etc.

Once the window format and the metadata are created, in some embodiments, before being provided to the video encoder, composite or multi-view video pictures wherein each multi-view picture is constructed as a spatial grid of pictures of different view angles. For example, as shown in the figure, based on the video streams at different view angles that define the different windows $505_{1-4}$, video streams $507_{1-4}$ comprising composite or multi-view pictures may be created, wherein the multi-view pictures may comprise the pictures of the different view angles defined in a window. The format of the multi-view picture, i.e. the way the pictures are ordered in the spatial grid, the resolution of each picture in the grid, the order in which the pictures are arranged in the grid, etc. may be referred to as the (multi-view) packing of the picture. For example, pictures of video streams $503_{1-4}$ defining a first window $505_1$ may be used to form multi-view pictures of a first video stream $507_1$ comprising pictures of the different view angles as defined by the first window. The formation of a view video stream comprising multi-view pictures may require pre-processing (stitching, polyphase, bitstream merging etc.), which may be applied on a per-window basis. The manner in which the pictures of the views can be combined to form a window, may be determined based on the video coded that is used during the encoding step, or from the existing/recommended view packing schemes (for example, the so-call quilt format of the LookingGlass format).

Sequences of pictures forming the video streams that are defined in a window, may be encoded in various bitrates (various video qualities) using a video encoder 508. The encoding process may be based on known multi-view video codecs such as MVC, MV-HEVC, or any other video coding scheme, including codecs used for "traditional" video coding (e.g. AVC, AV1, HEVC, VVC etc.). The embodiments described in this application may use existing video coding technology, both traditional and multi-view, without any modifications to the coding schemes. For each window however, the pictures may be encoded in multiple qualities so that bitrate adaptation can be used during streaming. For example, a window defining all the views may be available in low quality so that this window can be used by the streaming client as a fall-back option, for example, in case multi-view video data of a high-quality window selected by the client is not available in time. In some embodiments, for one viewing space different windows may be defined wherein each windows defines a predetermined number of views. Hence, this way, for one viewing space both a window with a first number of views (and first view spacing) and a second number of views (and second view spacing) may be defined wherein the first number of views may be larger or substantially larger than the second number of views.

The encoded video may be packaged as segments by a segmenter 510, i.e. sequences of video frames of a predetermined length. This way, temporally segmented video $511_{1-3}$ may be created and stored on a server system, e.g. a media server system of a content distribution network (CDN). A segment comprising a part of the encoded multi-view video data defined by a window may be created in different qualities $513_{1,2}$ (bitrates) of multi-view video. Each of the segments may be linked to a resource locator, e.g. an URL, so that the segments can be readily accessed and transmitted to clients.

Thereafter, a metadata generator 512 may generate window metadata. The window metadata may be formatted in a suitable format, e.g. a manifest file such as a Media Presentation Description (MPD), used by an adaptative streaming protocol such as MPEG-DASH. The window metadata may be divided into (at least) two categories: global window metadata and local window (per-window) metadata. Global window metadata may describe window properties that are shared between all windows or describe overall window properties defined in a manifest file. Local window metadata may describe the contents of a window and the relationship between views defined by the window. These metadata may be used by a client apparatus to identify which window or windows need to be requested, and which views are contained within each window with their high-level properties. Examples of Global window metadata may include the central viewing angle of a window, the window width, the number of vies, etc. Local window metadata examples include view spacing $\Delta\theta$, starting angle (of this window), etc.

Figure 6:
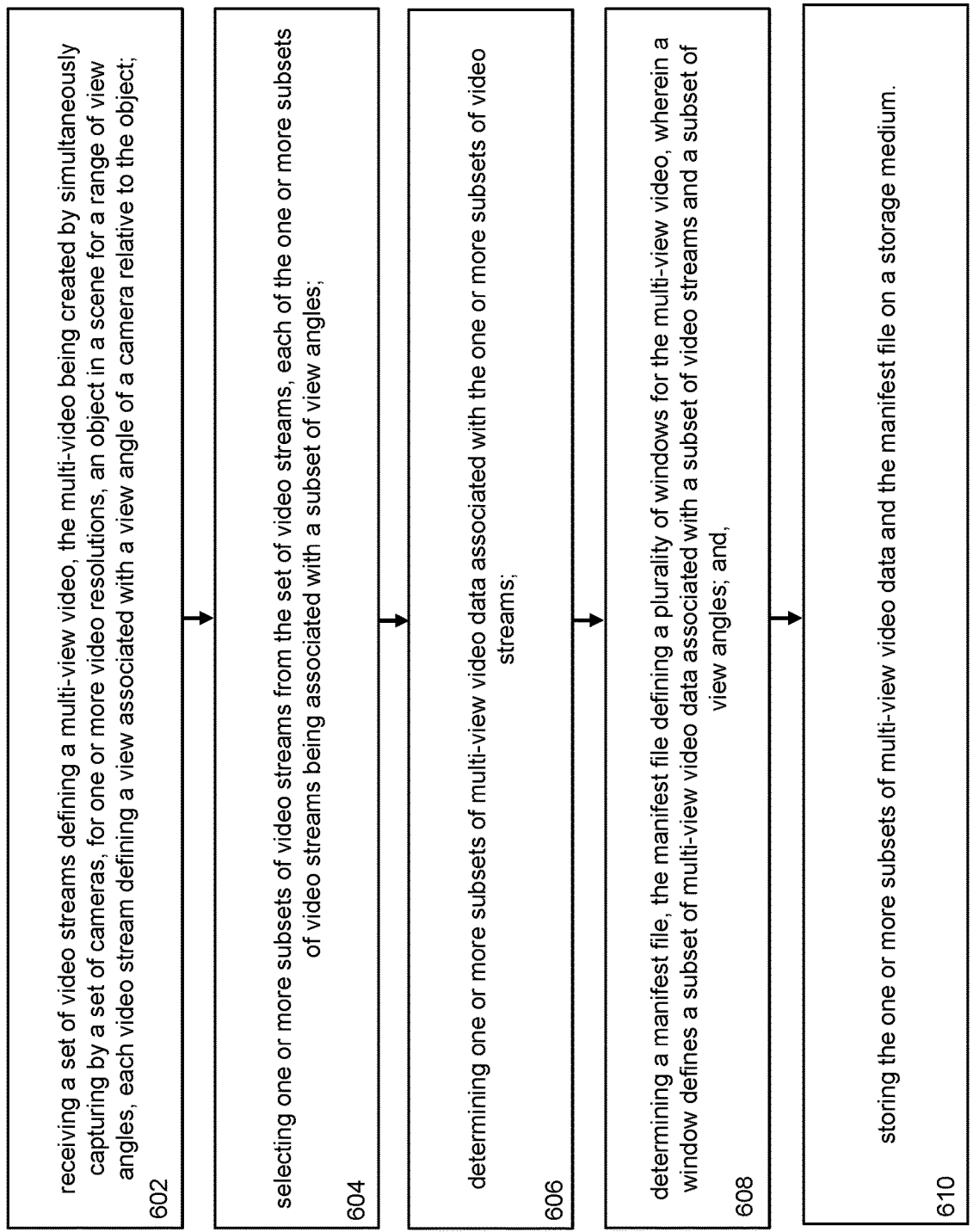
FIG. 6 depicts a method of processing multi-view video by a server apparatus according to an embodiment of the invention.

Thus, as described above, the invention may relate to a method of creating and storing a multi-view video data format that comprises windows, i.e. a "bundle" of video streams that are associated with different view angle ranges (also referred to as views). The method may be executed by a multi-view video data processing apparatus, that is capable of executing the processing steps as described with reference to FIG. 5. More generally, the invention may include a method of processing a multi-view video as shown in FIG. 6. As shown in this figure, the method may include a step of receiving a set of video streams defining a multi-view video (step 602). Here, the multi-view video may be created by simultaneously capturing an object in a scene by a set of cameras for a range of view angles, wherein each video stream may define a view associated with a view angle of a camera positioned relative to the object. The capturing of the scene by the cameras may be executed for one or more video resolutions, one or more video qualities, one or more focusing distances of the cameras and/or a number of different cameras, so that during streaming the resolution, quality (bitrate), distance, and/or number of views can be adapted based on certain conditions.

One or more subsets of video streams from the full set of video streams may be selected (step 604), wherein each of the one or more subsets of video streams may be associated with a subset of the set of view angles. This way, windows may be defined wherein at least part of the windows are defined as subsets of the full set of video streams that define the multi-view video. Here, a "window" may define a multi-view video data format including a "bundle" of video streams that are associated with different subset of view angles. In a further step, one or more subsets of multi-view video data may be determined, wherein a window may be associated with a subset of the multi-view video data (step 606). A subset of multi-view video data may for example include multi-view pictures, wherein each multi-view picture (video frame) includes pictures of each view angle as defined by the window.

Further, a manifest file may be determined which defines a plurality of windows for the multi-view video, wherein a window defines a subset of multi-view video data associated with a subset of video streams and a subset of view angle (step 608). The manifest file may be used by the client apparatus to request one or more windows based on a position of a viewer, relative to a multi-view display apparatus and the one or more subsets of view angles. The one or more sets of multi-view video data and the manifest file may be stored (step 610) on a storage medium of e.g. a server system, e.g. a media server, or content delivery network (CDN).

Hence, based on the multi-view video creation and processing process of FIG. 6, multi-view video may be formatted in windows, wherein each window represents a bundle of multi-view streams associated with a certain subsets of view angles. Pictures of the bundle of multi-view steams may be efficiently encoded into so-called multi-view pictures, wherein a multi-view picture includes the pictures of a scene for each view angle of the window at one time instance. A multi-view display may simultaneously render the multi-view pictures into a holographic image in a view direction as specified by the window parameters.

Windows may be defined based on limitations of the underlying hardware. For example, in an embodiment, a subset of views may be selected that are associated with a subset of the full set of view angles, wherein the subset of view angles may correspond to a field of view not larger than the maximum field of view of (pixels structures of) the multi-view display.

In an embodiment, different windows may be defined wherein ranges of view angles may overlap. In further embodiments, the windows may be selected so that the different ranges of view angles may cover the whole range of view angles that are available for a given multi-view video. In yet further embodiments, windows defining multi-view video for "true" holography (i.e. holographic effects in multiple directions, e.g. both horizontal and vertical) may define including a range of horizontal and vertical views.

In a further embodiment, one or more single-view windows may be defined comprising one single view. Single-view windows may be required because a client may only request windows, so that views that may be requested individually should be in a single-view window format. Such types of windows may be needed in case a client can only request multi-view video based on windows defined in a manifest file. Hence, a client can request both a high-quality window comprising a plurality of views in a range of view angles that match with the position of the viewer relative to the multi-view display and a low-quality window comprising only one view which may be used as a backup in case the bandwidth does not allow timely delivery of the views of the high-quality window.

In another embodiment, a full-view window may be defined including all available views for a certain multi-view video or all the views of a multi-view video that may be needed for a specific application. Such window may be used as a low-quality fallback, or for high-performance systems etc. In a further embodiment, so-called sparse windows may be defined. Depending on the use-case there may be support for different resolutions. This way, a low-quality window may define subsampled versions of available high-quality views. Since windows can be overlapping, there can be several such windows with different granularity, for different use-cases. In a further embodiment, one or more windows may be defined including views for certain predetermined popular viewer positions such a window containing central views. In an embodiment, one or more windows may be created based on viewing analytics, e.g. a certain side of the scene may hold more appealing content than the other side hence attracting more viewers.

The selection of views defining a window may depend on several factors: the multiview video acquisition setup, the rendering apparatus, the targeted application, etc. For example, in an embodiment, multi-view video content may be prepared for rendering on a holographic display device such as the 8K Looking Glass. This multi-view display device is capable of horizontal holography. The data format of the multi-view video is referred to as the so-called quilt format. LookingGlass models all support same types of quilts, wherein a quilt defines a multi-view picture comprising pictures of a predetermined number of pictures of different view angles arranged in a predetermined order. A content provider may define one or more windows that are suitable for such display device. For example, for the 8K Looking Glass multiple bitrate, e.g. a low and high bitrate, 35-view windows may be defined and multiple bitrate, e.g. a low and high bitrate, 45-view windows may be defined. All of the windows may cover the same total viewing angle. Thus, if a client apparatus does not have enough bandwidth to stream the high bitrate 45-view, it may decide to either drop in image quality or it may be decided to decrease the number of views, by selecting a lower bitrate window or a window with less views respectively.

Different global window properties may be defined. These global properties apply to all windows defined in a manifest file (and associated with a multi-view video). For example, for stereo/horizontal holography, one or more of the following global window parameters may be defined:

central view angle: 20 degrees [indicating that the window has a central view angle of 20 degrees]

view range: 180 degrees [indicating that the leftmost view (of the leftmost window) is 180 degrees apart from the rightmost view (of the rightmost window)]

Additionally, common properties of all views defined by all windows in a manifest file may (optionally) be signalled as global window metadata; e.g. "Aperture: f/2" assuming that during the recording, all the cameras generating the views used the same aperture setting. Global window properties may not only relate to the content, but may also include metadata for initializing the client, extracting the views from the windows etc. Examples of such metadata may include:

Packing method: Quilt [indicating that video streams includes multi-view pictures having a packing format based on the quilt format, i.e. stitched pictures with view angles defining a horizontal displacement, other examples would be "Grid" (stitched with horizontal and vertical displacement), "Strip" (stitched in one row, with only horizontal) etc.]

Packing order: left to right, up to down [indicating that the picture of the first view angle in order is the top left, the second one is the top second from the left etc.]

Padding: 5 pixel guard band [to indicate that pictures of different view angles in a multi-view picture are separated by to avoid voiding artefact that may occur within the frame and across the views, e.g. chroma aberration, smoothing between views, etc. Those phenomena occur because traditional 2D video coding does not expect to have artificial boundary with video frames.

In further embodiments, different local (per-window) properties may be defined. For example, in an embodiment, local window metadata may relate to properties of views defined by a window. Examples of such metadata may include:

Starting angle: 10 degrees [indicating that the leftmost view of the window is at 10 degrees]

View spacing: 2 degrees [indicating that each view is 2 degrees apart from the previous]

Number of views: 6 [indicating the total number of views defined by a window]

Based on the aforementioned properties, a set of windows and their contained views for equally spaced horizontal views setup may be described. Other types of properties may be used in case there is not uniform distribution etc. Also, if there are differences between the global window metadata and the specific window they can be signalled as such; for example, a window might have a different "Padding" value than the default as defined on the basis of the global window properties.

The local window metadata may also comprise information required for post-processing. Examples of such metadata may include:

Interpolation views: defines a list of views that are recommended to be used when interpolation is to be applied (e.g. because the window contains already views generated by interpolation thus it is recommended to use original views)

Grid dimensions: indicating how many rows/columns are contained in this window (this can generic information for unpacking, or format specific, for quilts)

Pitch/Slope/Center: example values required for initializing a holographic display View Cone: define properties of a viewing cone for adjustable FOV displays.

These metadata may describe high-level information. Preferably, window metadata may be signalled outside the video bitstream. For example, in a DASH environment, window metadata may be signalled on MPD-level. In an embodiment, each window may be defined as an Adaptation Set. In an embodiment, for ISOBMFF-like file format encapsulation, a window may be packaged and stored as a separate track and the metadata may be stored and signalled via a (timed) metadata track.

To define windows in a manifest file, a Window Descriptor may be used. Table 1 below provides a non-limiting list of window parameters that may be used together with the Window descriptor:

| parameter | | |
| --- | --- | --- |
| window_id | integer (0 global) | an integer with the window id |
| holography | integer (0 default) | 0: Full, 1: Horizontal, 2: Vertical indicates whether the view displacement is horizontal, vertical |
| leftmost_view | float (0 default) | the leftmost view angle contained in the window |
| rightmost_view | float (0 default) | the rightmost view angle contained in the window |
| top_view | float (0 default) | the top view angle contained in the window |
| bottom_view | float (0 default) | the bottom view angle contained in the window |
| columns | integer | number of columns containing views |
| rows | integer | number of rows containing views |
| master_window | integer | 0: False, 1: True indicates that this window contains all the available views |

Here, a unit for angles and the view ordering may be defined. In the following embodiments, angles may be expressed in degrees and the view ordering in a multi-view picture (as e.g. described with reference to FIG. 5) may be left-to-right/top-to-bottom.

Hereunder, different embodiments of manifest files defining windows are described provided. In particular, the embodiments relate to so-called media presentation description (MPD) files for MPEG-DASH media streaming. In an embodiment, packaged multi-view pictures may be encoded by spatially segmenting the multi-view pictures in so-called video tiles. The spatial segmentation is done such that the boundaries of the tiles coincide with the boundaries of the different pictures in a multi-view picture. This way pictures with different view angles may be encoded as tiles. Pixels in one tile of a multi-view picture do not have any coding dependencies of pixels in other tiles of the multi-view pictures. This way, the pictures of one view angle may be stored as an encoded representation of a stream of pictures associated with one view angle. This way, encoded representations of steams of pictures associated the view angles of a window may be stored and individually accessed by a client device.

In an embodiment, for MPEG-DASH, the Windows descriptor may be signalled as a so-called EssentialProperty. The EssentialProperty may be defined on Period-level, in that case the Window descriptor may define Global Window properties. Further, each individual window may be mapped to an AdaptationSet and the EssentialProperty of each AdaptationSet may comprise the window descriptor of the respective window. The Representations within the same AdaptationSet relate to the same window, wherein each representation may relate to a different quality version, e.g. different bitrate.

A first example hereunder describes an MPD comprising windows descriptors describing simple horizontal holographic windows. The MPD may define multi-view "holography-type" video based on a window descriptors as described above. The first descriptior schemeIdUri="urn:mpeg:dash:window:2020" value="0, 1, 0, 60 as described indicates that the multi-view video relates to a row of horizontal views, wherein the viewing area is defined by a left most view angel of zero degrees and a right most view angel of 60 degrees.

```xml
<MPD>
...
<Period duration="PT0H0M20.000S">
    <!-- Top-level window descriptor for the Global Window metadata. The values are interpreted
as following: 0 (global window metadata), 1 (horizontal-only adaptation), 0 (leftmost view
angle), 60 (rightmost view angle). The rest of the values are not applicable -->
    <EssentialProperty schemeIdUri="urn:mpeg:dash:window:2020" value="0, 1, 0, 60"/>
    <!-- Each AdaptationSet contains a window -->
    <AdaptationSet segmentAlignment="true" bitstreamSwitching="true" maxWidth="640"
maxHeight="320" maxFrameRate="90000/2163" par="2:1" lang="und">
        <!-- Hypothetical window containing four views packed in a row, covering the left 30degrees
of content -->
        <EssentialProperty schemeIdUri="urn:mpeg:dash:window:2020" value="1, 1, 0, 30, 0, 0, 4,
1, 0"/>
        <Representation id="1">
            ...
        </Representation>
        <Representation id="2">
            ...
        </Representation>
    </AdaptationSet>
    <AdaptationSet segmentAlignment="true" bitstreamSwitching="true" maxWidth="640"
maxHeight="320" maxFrameRate="90000/2163" par="2:1" lang="und">
        <!-- Hypothetical window containing four views packed in a row, covering the right 30degrees
of content -->
        <EssentialProperty schemeIdUri="urn:mpeg:dash:window:2020" value="2, 1, 30, 60, 0, 0, 4,
1, 0"/>
        <Representation id="1">
            ...
        </Representation>
        <Representation id="2">
            ...
        </Representation>
    </AdaptationSet>
    <AdaptationSet>
        ...
    </AdaptationSet>
</Period>
...
</MPD>
```

Two further window descriptors, schemeIdUri="urn:mpeg:dash:window:2020" value="1, 1, 0, 30, 0, 0, 4, 1, 0" and schemeIdUri="urn:mpeg:dash:window:2020" value="2, 1, 30, 60, 0, 0, 4, 1, 0" define two windows (window id's 1 and 2) each defining four views, wherein the views of the first window cover an area between 0 and 30 degrees, and the views of the second window cover an area between 30 and 60 degrees.

A second example hereunder describes an MPD comprising windows descriptors describing "true" holographic windows, i.e. windows defining views in both the horizontal and the vertical direction. Here, a first window descriptor chemeIdUri="urn:mpeg:dash:window:2020" value="0, 0, 0, 60, 30,0" may define global properties of the windows, including 0 degree left most view angle, 60 degree right most angle, 30 degree top view angle and 0 degree bottom view angle wherein the angels determined relative to the central axis of the display.

A second example hereunder describes an MPD comprising windows descriptors for both for horizontal and vertical holography. The MPD may define multi-view "holography-type" video based on a window descriptors as described above, including a horizontal view angle of 60 degrees and vertical view angle of 30 degrees. This example defines two partially overlapping windows and a "master" window, comprising all the available views.

```xml
<MPD>
...
<Period duration="PT0H0M20.000S">
    <!-- Top-level window descriptor for the Global Window metadata. The values are interpreted
as following: 0 (global window metadata), 0 (true holography), 0 (leftmost view angle), 60
(rightmost view angle), 30 (top view angle), 0 (bottom view angle). The rest of the values are
not applicable -->
        <EssentialProperty schemeIdUri="urn:mpeg:dash:window:2020" value="0, 0, 0, 60, 30, 0"/>
        <!-- Each AdaptationSet contains a window -->
        <AdaptationSet segmentAlignment="true" bitstreamSwitching="true" maxWidth="640"
maxHeight="320" maxFrameRate="90000/2163" par="2:1" lang="und">
            <!-- Hypothetical window containing six views packed in two rows, covering the left
20degrees / bottom 20degrees of content -->
            <EssentialProperty schemeIdUri="urn:mpeg:dash:window:2020" value="1, 0, 0, 20, 20, 0, 3,
2, 0"/>
                <Representation id="1">
                    ...
                </Representation>
```

```
        <Representation id="2">
          ...
        </Representation>
    </AdaptationSet>
    <AdaptationSet segmentAlignment="true" bitstreamSwitching="true" maxWidth="640"
maxHeight="320" maxFrameRate="90000/2163" par="2:1" lang="und">
        <!-- Hypothetical window containing 10 views packed in two rows, covering the right
50degrees / top 20degrees of content -->
        <EssentialProperty schemeIdUri="urn:mpeg:dash:window:2020" value="2, 0, 10, 60, 10, 20,
5, 2, 0"/>
        <Representation id="1">
          ...
        </Representation>
        <Representation id="2">
          ...
        </Representation>
    </AdaptationSet>
    <AdaptationSet segmentAlignment="true" bitstreamSwitching="true" maxWidth="640"
maxHeight="320" maxFrameRate="90000/2163" par="2:1" lang="und">
        <!-- Master window containing all the views -->
        <EssentialProperty schemeIdUri="urn:mpeg:dash:window:2020" value="3, 0, 0, 60, 0, 30, 6,
3, 1"/>
        <Representation id="1">
          ...
        </Representation>
        <Representation id="2">
          ...
        </Representation>
    </AdaptationSet>
    <AdaptationSet>
      ...
    </AdaptationSet>
</Period>
  ...
</MPD>
```

The first window descriptor schemeIdUri="urn:mpeg:dash:window:2020" value="1, 0, 0, 20, 20, 0, 3, 2, 0" describes six views in two rows covering 0 degree left most view to 20 degree right most view and 20 degree top view up to 0 degree bottom view. Similarly, the second window descriptor schemeIdUri="urn:mpeg:dash:window:2020" value="2, 0, 10, 60, 10, 20, 5, 2, 0" describes 10 views in two rows covering 10 degrees left most view to 60 degree right most view and 10 degree top view to 20 degree bottom view. Finally, a third window descriptor schemeIdUri="urn:mpeg:dash:window:2020" value="3, 0, 0, 60, 0, 30, 6, 3, 1" describes a master window comprising all the views, i.e. 18 views covering a grid of 6 columns and 3 rows covering 0 degrees left most view to 60 degrees right most view.

Although both examples above describe windows defining multi-view video of the same resolution, multi-resolution windows may be defined based on the same descriptor. The equivalent example for storage in an ISOBMFF format based on the Period element (and the associated Global Window metadata) corresponds to the "moov" box and each adaptation set may be stored in a separate track.

Low-level metadata, which may include specific properties of the views, codec-specific information, etc. may be signalled as signalling messages, e.g. supplemental enhancement information SEI-messages, in the bitstream. Most of the SEI messages to be transmitted will be to convey codec-specific information, and since the codec is signalled at initialization, the underlying application should be able to parse those messages. Below some exemplary SEI messages, taken from the MVC extension of AVC/H.164. In an embodiment, a so-called "Multiview scene information SEI message", may be used indicating the maximum disparity among multiple view components in an access unit. Exemplary uses of this message may include interpolating views of the window and general post-processing operations. A further embodiment, a "Non-required view component SEI message", may be used indicating that a particular view component is not needed for decoding. Since a requested window may contain more views than actually needed for rendering, this SEI message may be used to indicate whether views inside the window that are not needed for rendering should be decoded nonetheless. In an embodiment, a "Multiview acquisition information SEI message" may be used. This SEI message specifies various parameters of the acquisition environment, and specifically, the intrinsic and extrinsic camera parameters. Hence, this message may be used for post-processing/interpolation and/or focal length adjustment/corrections, denoising etc. of window-based multiview video. In yet another embodiment, a "Frame Packing Arrangement (FPA) SEI message" may be used. This message was originally defined for stereoscopy applications. Hence, this SEI message may be used for any window containing a few, e.g. two, views. For example, this message may be used to indicate how the actual samples are packed in a frame (interleaved, side-by-side etc.).

Most of the SEI messages to be transmitted will be to convey codec-specific information and to that end, some of these SEI messages can be relevant; for example, MVC has the "Multiview Acquisition Information" SEI message that has the characteristics of the camera that recorded the view. For the multi-view video streaming process however most of the information will be signalled at MPD-level, since it is required both for the window selection and the post-processing step.

Figure 7:
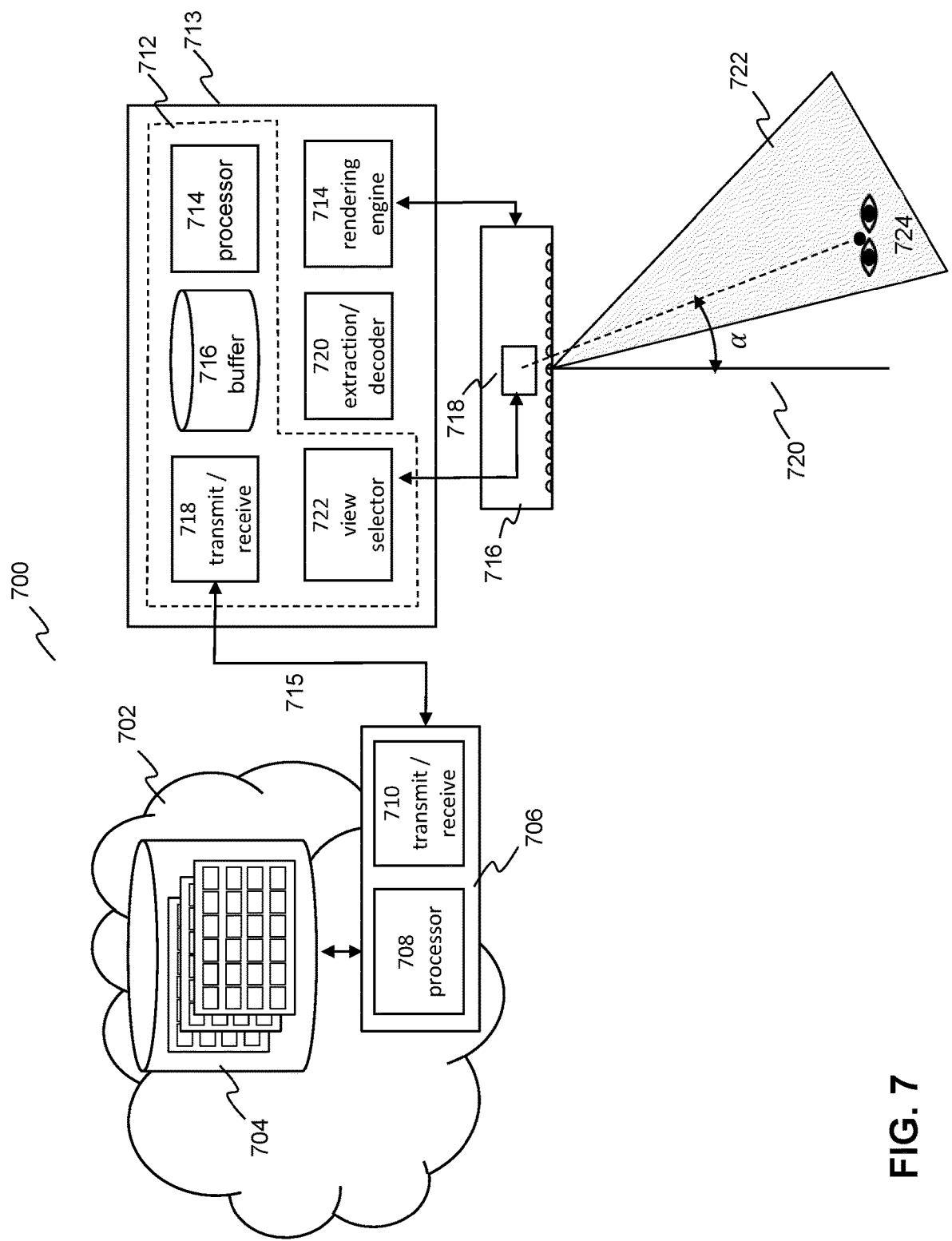
FIG. 7 depicts a schematic of a system for streaming and rendering multi-view video according to an embodiment of the invention.

FIG. 7 depicts a schematic of a system for streaming and rendering multi-view video according to an embodiment of the invention. In particular, this figure schematically illustrates includes a server system 702 for streaming video, in particular multi-view video, stored on one or more data storage devices 704, e.g. a one or more media servers, to one or more client devices 712. A client device may be connected to or part of a video processing device 713, which may include or be connected to an output apparatus 716, e.g. a display apparatus that is capable of rendering multi-view video as described with reference to the embodiments in this application.

Streaming technologies that may be used for streaming video to the client devices may include HTTP adaptive streaming (HAS) schemes, for example MPEG-DASH and HTTP Live Streaming (HLS), that specify adaptive bitrate video streaming schemes based on video data and associated metadata. The video data may be organized and structured based on a certain data format which may be defined by a HAS streaming standard or MPEG-CMAF which describes encoding and packaging schemes for segmented objects. CMAF is an ISO standard developed by MPEG harmonizing codec profiles and segment formats for HAS schemes such as MPEG-DASH and HLS. In some embodiments, the data format of the video data may include playback periods including one or more adaptation sets, an adaptation sets including media representations of different resolution and/or quality and a representation including a sequence of media (video) segments, wherein a media segment includes a compressed video data of a predetermined quality.

The metadata associated with the video data may be organized in a manifest file or a manifest file update patch, which includes metadata to transform a manifest file a client device is currently using, into a manifest file for the next playback period. During the video creation process manifest files may be generated and stored together with the video data on a media storage device. A manifest file may be referred to in MPEG DASH as a Media Presentation Description (MPD) and may be structured in accordance with a certain machine-readable document format, e.g. XML or the like. A manifest file may comprise information about media assets, e.g. media streams including video and audio streams, that are available to the client device and information how a client device can retrieve these media assets. A manifest file may include segment identifiers, e.g. in the form of URLs, so that a client device is able to request video segments for a server. Different ways for signalling the segment identifiers may be used e.g. URL templating, explicit URLs, etc.

Streaming server 706 may be configured for streaming multiview video data of a scene to the client device. To that end, streaming server 706 may comprise a server processor 708 and a network interface 10 to a network. The network interface may for example be a wired communication interface, such as an Ethernet or fiber-optic based interface. The network may for example be the Internet or a mobile network, wherein the streaming server may be connected to a fixed part of the mobile network. Alternatively, the network interface may for example be a wireless communication interface, which may also be referred to as a radio interface, and which may be configured to connect to a mobile network infrastructure. In some examples, the network interface may comprise a radio interface, for example an 4G or 5G radio interface for connecting to a 4G or 5G mobile network adhering to one or more 3GPP standards, or a Wi-Fi communication for connecting to a Wi-Fi network infrastructure or any other wireless interface.

In an embodiment, the server may be a so-called edge server, i.e. a server which is located at the edge of a network. An edge server may for example be co-located with a base station of a wireless telecommunication network. This way, the edge server is physically located relatively close to client devices that are connected to the base station. This way a fast, low-delay data connection may be established between the edge server and a client device. For example, the connection between the edge server and the client device may e.g. be based on the 5G standard having a latency lower than the motion-to-high-quality latency that is required to enable an immersive experience by the user of the video processing device. For example, a Mobile Edge Computing or Multi-access Edge Computing (MEC) unit may be used wherein storage, networking resources and data processing, such as the video processing described with reference to the embodiments in this disclosure, may be integrated or associated with a base station, e.g. an eNodeB, that is part of a radio access network (RAN). This way, computer intensive and latency sensitive applications like multi-view video and augmented reality applications may be hosted at the edge of the network. The connection between the edge-server and the client device thus provides a fast data communication channel.

It is noted that the data communication between the streaming client and the streaming server may involve multiple networks. For example, the streaming client may be connected via a radio access network to a mobile network's infrastructure and via the mobile network's infrastructure to the Internet, with the streaming server being a server which is also connected to the Internet.

The server processor may be configured, e.g., by hardware design or software, to perform the operations described in this application in as far as pertaining to a streaming server or in general to the streaming of video data of multi-view video of a scene to a client device. In general, the processor may be embodied by a single Central Processing Units (CPU), such as a x86 or ARM-based CPU, but also by a combination or system of such CPUs and/or other types of processing units. The server may be distributed over different entities, e.g., over different servers. In that case, the processor may also be distributed, e.g., over the CPUs of such different servers. The streaming server may comprise one or more data storage devices 704, such as a hard drive or an array of hard drives, a solid-state drive or an array of solid-state drives, etc., which may be used to store data. In an embodiment, the server may be a content delivery node, or may be implemented in a distributed manner using a number of content delivery nodes. In an embodiment, the content delivery nodes may be part of a content delivery network (CDN). The streaming server may also be implemented by another type of server or a system of such servers. For example, the streaming server may be implemented by one or more cloud servers or by one or more edge nodes of a mobile network.

The client device 712 comprising a processor 714, a buffer 716 for storing video data, such as video segments, and metadata associated with the video segments, e.g. a manifest file, and a client network interface 718 for connecting the client device to a network so that a data connection 715 for video streaming between the client device and the server can be established. The client device may be configured to process multi-view video data is formatted based windows as described with reference to the embodiments in this application. To that end, the client device may comprise a view selector 722 configured to select views and associated windows based on the metadata associated with available multi-view video and based on position information of one or more viewers 724 positioned relative to display apparatus 716, which may be provided or generated by a position sensor 718.

Similar to the server network interface, the client network interface may be a wired or a wireless network interface. For example, a radio network interface such as a 4G or 5G radio interface for connecting to a 4G or 5G mobile network adhering to one or more 3GPP standards, or a Wi-Fi communication interface for connecting to a Wi-Fi network infrastructure, etc. The data communication between the client and the server may involve multiple networks. For example, the streaming client may be connected via a radio access network to a mobile network's infrastructure and via the mobile network's infrastructure to the Internet, with the streaming server being a server which is also connected to the Internet. The client device may further comprise a processor configured, e.g., by hardware design or software, to perform the operations described in this specification in as far as pertaining to a client device or in general to the receiving, by streaming, of video data of multi-view videos of a scene. In general, the processor may be embodied by a single Central Processing Unit (CPU), such as a x86 or ARM-based CPU, but also by a combination or system of such CPUs and/or other types of processing units, such as Graphics Processing Units (GPUs).

Generally, the client device may be embodied by a (single) device or an apparatus capable of processing video data, e.g., a smartphone, personal computer, laptop, tablet device, gaming console, set-top box, television, monitor, projector, smart watch, smart glasses, media player, media recorder, etc. In some examples, the client device may be a so-called User Equipment (UE) of a mobile telecommunication network, such as a 5G or next-gen mobile network. In other examples, the client device may be an edge node of a network, such as an edge node of the aforementioned mobile telecommunication. In such examples, the client may lack a display output, or at least may not use the display output to display the received video data. Rather, the streaming client may receive the video data from a streaming server and reconstruct a multi-view video therefrom, which may then be made available for streaming, for example via tiled streaming, to a further downstream streaming client, such as an end-user device.

As shown in FIG. 7, the client device may be part of a video processing device 713, which may include a video data extractor and decoder 720 for unpacking buffered video data, e.g. video segments, and forwarding encoded multi-view video data contained in the video segments to a decoder process to decode the encoded multi-view video data into pictures associated with different view angles. The decoded pictures may comprise for each time instance different pictures of the same scene for different view angles. A multi-view video rendering engine 714 may be configured to simultaneously rendered (played out) the pictures of a multi-view video on a multi-view display apparatus 716. Here, 'rendering' refers to process steps by which the pictures may be converted into a displayable form.

To achieve position-based multi-view video streaming as described with reference to the embodiments in this application, the system may further include a position sensor 718 for detecting an angular position of a viewer 724 relative to the display apparatus. The position sensor may be implemented in different ways. For example, the position sensor may be a camera system configured to capture pictures of viewers watching the video display apparatus. The central axis of the camera system may be aligned with the central axis of the display device so that the camera system may capture pictures of one or more viewers watching the display device and to determine depth information associated with the one or more viewers. For example, in an embodiment, the depth information may include a so-called depth maps for pictures generated by an image sensor of the camera system. The depth map of a picture, e.g. an RGB picture, may be represented as a pixelated image comprising pixel values representing a distance value for each pixel of a video frame. The distance value may define a distance between the camera (the imaging plane of the camera) and objects, in this case one or more viewers, in the video frames. Camera systems that are capable of generating depths map are well known in the art. For example, in an embodiment, a camera may be implemented as a 3D camera system e.g. stereo camera comprising two or more camera modules, wherein each camera module has its own lens system. This way, two images of the same scene from different points of view are acquired. Such stereo camera may be used to determine depth maps and/or 3D pictures. It is submitted that the position sensor for sensing the position of viewers relative to the display apparatus is not limited to stereo based imaging techniques. Other 3D imaging techniques may be used as well. For example, a depth map may be generated based on an RGB/IR technique (as used by the Kinect), a laser scanner or a 3D time-of-flight (TOF) technique or combinations thereof.

The pictures of the camera system may be processed real-time by a well-known object detection and tracking algorithm that is configured to determine the position of one or more viewers, preferably the eyes positions, in the pictures. Based on the detected position in the pictures and the depth information associated with the pictures, position information of a viewer relative to the display apparatus can be determined. The position information may include the angular position α measured as the angle between the central axis of the display apparatus and a viewer axis representing an imaginary line which runs through the position of the viewer and the position of the pixel structure at the central axis of the display. Further, the position information may include a radial distance representing a distance between the pixel structure of the central axis and the viewer along the viewer axis.

The determination of the angular position of the view may depend on the application and/or display apparatus. For example, FIG. 7 may depict an application wherein the display apparatus is configured to render a "horizontal" holographic effect based on horizontal views only. In that case, it may be assumed that the display device is positioned at eye's height so that the viewer's position can be described as a 2D position relative to the central axis as depicted in the figure. More complex "true holographic effects" are rendered based on horizontal and vertical views. Hence, in that case, the position of the viewer is a 3D position relative to the central axis of the display device. In that case, a suitable coordinate system may be selected to determine the angular and radial position of the viewer relative to the central axis.

Based on the position information that is computed by the position sensor or computed on the basis of the information generated by the position sensor, a view selection module 722 of the client device may be configured to determine which window or which windows should be requested from the server. This way, only a part of the views that are visible to the viewer are streamed to the client device for producing a holographic effect that is visible for the viewer. The view selection module may select the one or more windows based on the stored manifest file, which includes window descriptors defining the view angles of the windows.

The system may be configured to perform position-based multi-view video streaming according to the scheme described with reference to FIG. 4. The video streaming process may start with initialization of the client device. During initialization, the client device may retrieve metadata associated with the multi-view video. For example, in case of MPEG DASH distribution the client device may retrieve or receive an MPD and parses the high-level information contained, required to initialize the underlying services. This information may for example include the Global Window properties, and other information about the video coded that is needed to initialize the video decoder and information that is needed to initialize the rendering engine and the display apparatus.

Then, the video application may determine which views are needed. This decision may be based on position information that is determined by a position sensor, which will continuously determine and update the position of one or more views relative to the display apparatus during the streaming and rendering process. The position of a viewer may be tracked and a prediction of where the viewer may be positioned within a short time period (~1 s) may be made. Hence, the position information that is measured at time t may not necessary be the position of the viewer at that time but could also be an expected position at time t+d that is determined based on the measured position at time t. This predicted position may be used by the client device for the selection of the windows. When the views are available at the client side and decoded into pictures with different view angles, the client device may again check the position of the user so that the views the closest value of the true position of the viewer can be made.

Thus, the view selector 722 may use an estimated viewer position at a certain annular position relative to the display apparatus to determine a certain number of views having view angles in a range around the estimated viewer position so that a holographic effect can be produced in the direction of the viewer. Based on the determined views, the view selector may determine one or more windows that comprise the views that are needed for the holographic effect. The viewer may move in front of the display, hence in some embodiments, the position information may also include an estimate of a future position of the viewer (e.g. based on a movement of the viewer in a certain direction).

In some embodiments, the view selector may also take the available bandwidth into account. For example, if an application would require views A,B,C,D,E and two different windows are available, e.g. a first window comprising all the views and a second "sparse" window comprising views A,C,E, then the view selector may select the second window to save bandwidth. In that case, the client device may use an interpolation algorithm to compute views B and D based on views A,C and E in order to obtain the required views A,B,C,D and E. It is noted that this example is merely for illustrative purposes, in realistic cases windows will define a large number of views to ensure that holographic effects can be achieved.

After selection of the window (or windows), the client device may request the one or more windows from the server, which may stream the selected multi-view video to the client device using a suitable streaming protocol. After reviewing the multi-view video, e.g. in the form of video segments, the client device may determine the pictures associated with the desired view angles. These pictures may be determined based on the way the multi-view video is packaged.

For example, in an embodiment, the views A,B,C,D,E may be encoded as multi-view picture wherein each view in the multi-view picture is encoded as an independently decodable spatial tile, e.g. an HEVC tile. In that case, the tiles that contain the desired views, e.g. A,C and E, may be streamed to the client device and decoded, wherein the additional views B and D may be computed based on A,C and E as a post-processing step. Obviously, in case sufficient bandwidth is available all views A,B,C,D,E may be streamed to the client device.

Alternatively, in case of a conventional codec (e.g. AVC/H.264) is used for encoding the views, all views may be coded as multi-view pictures. In that case, after decoding, the multi-view pictures needed to be post-processed, wherein each multi-view picture may be separated in a plurality of pictures associated with the different view angels of the views A,B,C,D,E. This post-processing may include cropping individual pictures of the different view angles from a multi-view picture and scaling the individual pictures to a desired size. In some embodiment, the individual pictures may be transformed to a device-specific format. For example, in case of a Looking Glass display, the individual pictures may be scaled and stitched into pictures that comply with the quilt format.

Figure 8:
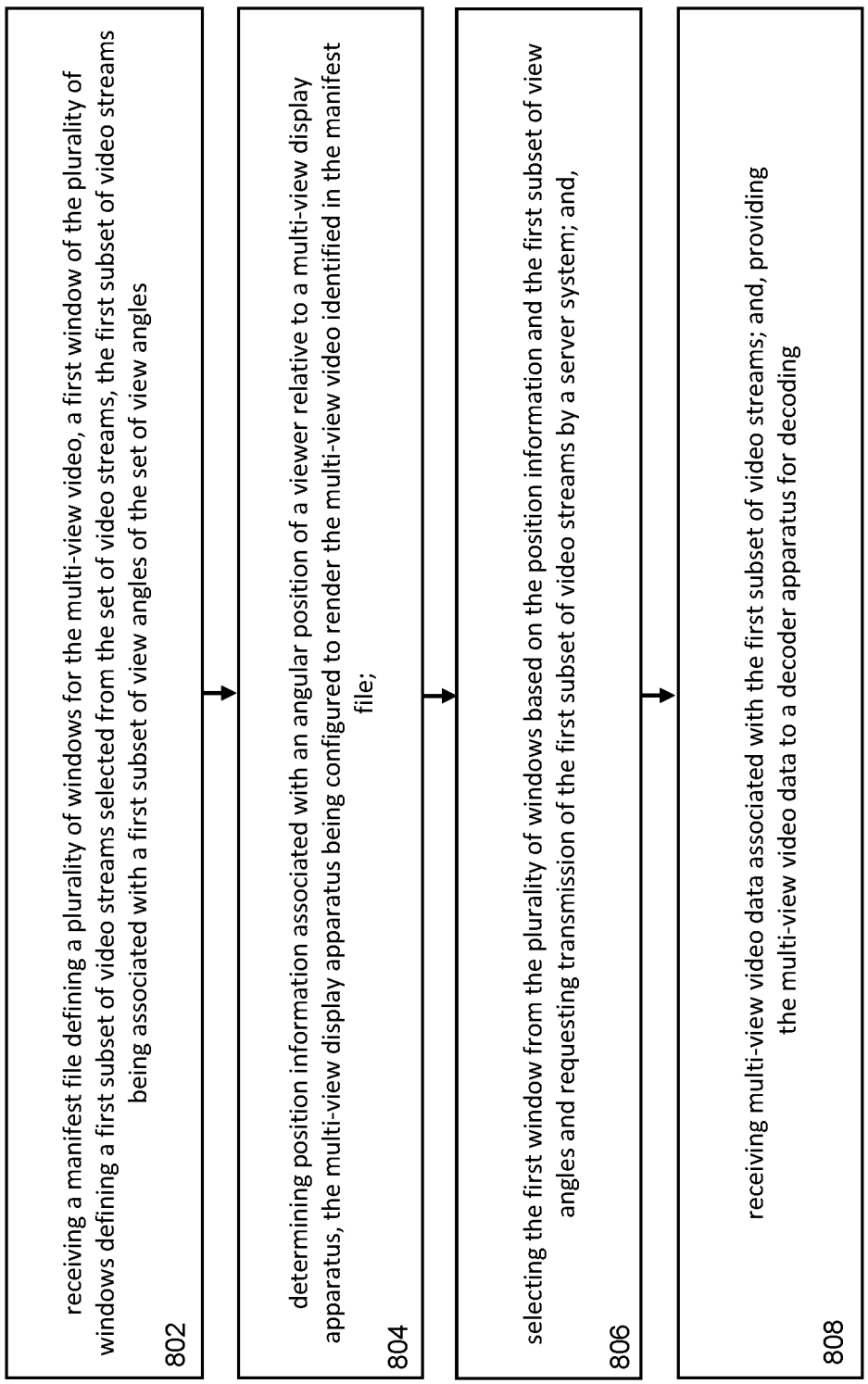
FIG. 8 depicts a method of processing multi-view video by a client apparatus according to an embodiment of the invention.

Thus, as described above with reference to FIG. 7, the invention may relate to a method of streaming a multi-view video to a client device. The multi-view video may comprise a set of video streams created by a set of cameras simultaneously capturing an object in a scene for a range of view angles and for one or more video resolutions, each video stream defining a view associated with a view angle of a camera relative to the object. The streaming of multi-view video may be based on a multi-view video data format that includes a "bundle" of video streams that are associated with different view angle ranges (also referred to as views). This bundle of views may be referred to as a window, which allows efficient streaming of multi-view video based on the position of a viewer relative to a multi-view display apparatus. A generic process of such position-based multi-view video streaming is described with reference to FIG. 8.

As shown receiving a manifest file defining a plurality of windows for the multi-view video, a first window of the plurality of windows defining a first subset of video streams selected from the set of video streams, the first subset of video streams being associated with a first subset of view angles of the set of view angles (step 802). Hence, in this step at least part of the windows may be defined as a bundle of video streams associated with a subset of view angles wherein the subset of view angles is selected from the set of view angles that are available for the multi-view video.

Then, position information may be received or determined, wherein the position information is associated with an angular position of a viewer relative to a multi-view display apparatus (step 804). Thus, in this step, position information of a viewer relative to the display apparatus may be determined using e.g. a position sensor, e.g. an imaging system, close to the display apparatus. The imaging system may be configured to track the position of one or more viewers, in particular the eyes of the one or more viewers, in pictures generated by the imaging system. The imaging may be further configured to determine depth information, e.g. a depth map, for the generated pictures so that an image processing algorithm can be used to determine a position of a viewer. This position may be an estimated position e.g. an estimated position of the viewer at a short time in the future. Thereafter, in a further step the client device may select one or more windows based on the position information and request a server system transmission of the requested window to the client device (step 806). Finally, the method may include a step of the client device receiving multi-view video data associated with the first subset of video streams;

and, providing the multi-view video data to a decoder apparatus for decoding the encoded first subset of video streams (step 808).

Figure 9:
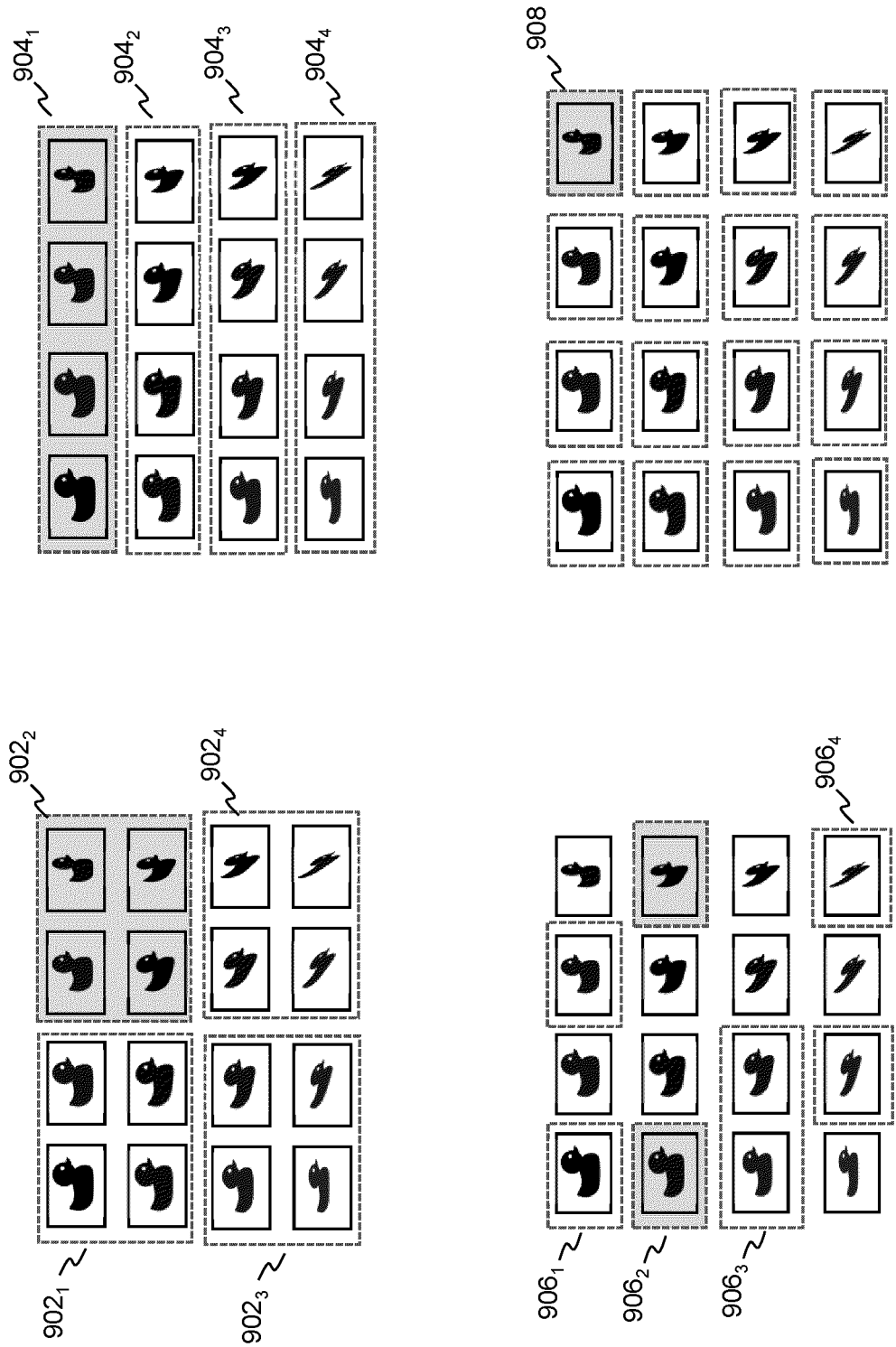
FIG. 9 illustrates various window data formats for streaming multi-view video according to an embodiment of the invention.

FIG. 9 illustrates various window data formats for streaming multi-view video according to an embodiment of the invention. FIG. 9A illustrates an example of an embodiment, illustrating two dimensional windows $902_{1-4}$ for "true" holography wherein each window includes both horizontal and vertical views. FIG. 9B illustrates an embodiment, illustrating one dimensional horizontal windows $904_{1-4}$ for horizontal holography. In a similar way, vertical windows can be defined. An example of a horizontal holographic display is the Looking Glass device. FIG. 9C illustrates an embodiment illustrating sparse windows $906_{1-4}$. Depending on the use-case there may be different angular resolution versions of views supported (e.g. a horizontal window of four views and a. horizontal window of two views), therefore windows that may be regarded as "subsampled" versions of the available views can be defines. Since different windows can have overlapping views, one can define several such windows with different granularity for different use-cases. FIG. 9D illustrates an embodiment wherein each window includes a single view. Such window may be used in combination with windows comprising multiple views. Since a client device can only request windows defined in an MPD, views that may be requested individually should be defined as single-view windows. Similarly, in another embodiment, a window may be defined comprising all views. Such window may be used as a fallback window, for example comprising low-resolution views, and may be displayed in case of sudden movement by the user or a new user appearing.

Figure 10:
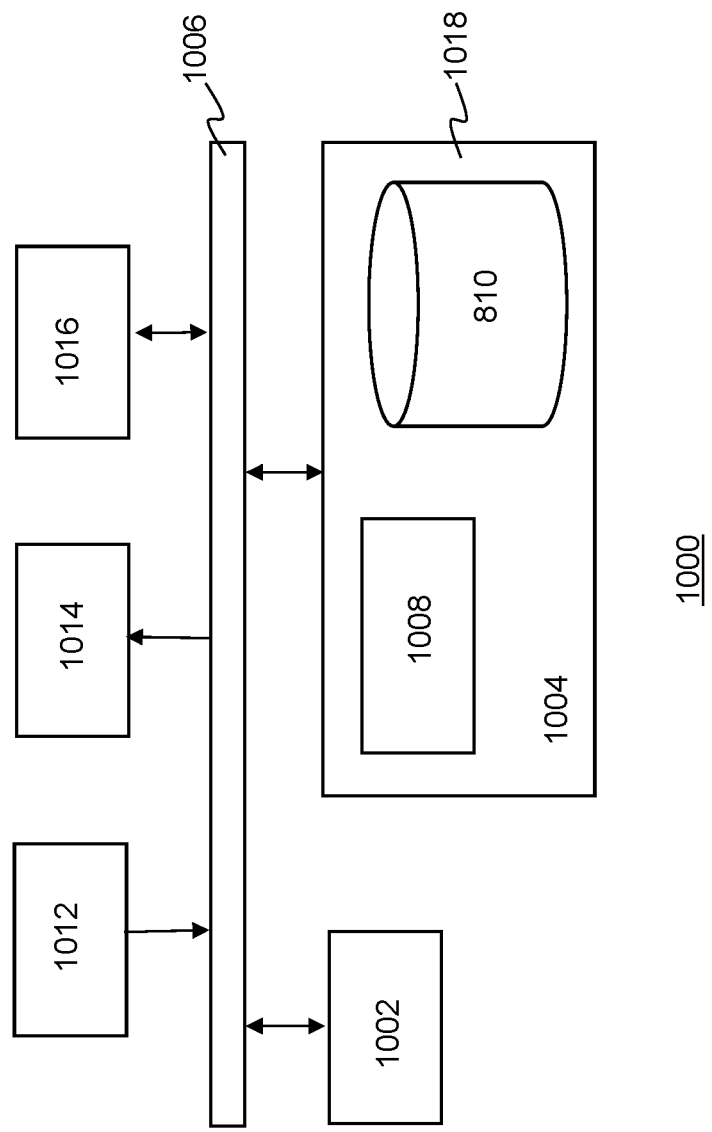
FIG. 10 is a block diagram illustrating an exemplary data processing system that may be used in as described in this disclosure.

FIG. 10 is a block diagram illustrating an exemplary data processing system that may be used in a client apparatus, a multi-view video authoring system, and/or a server as described in this disclosure. Data processing system 1000 may include at least one processor 1002 coupled to memory elements 1004 through a system bus 1006. As such, the data processing system may store program code within memory elements 1004. Further, processor 1002 may execute the program code accessed from memory elements 1004 via system bus 1906. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

Memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive or other persistent data storage device. The processing system 1900 may also include one or more cache memories (not shown) that provide temporary storage of at least some program code in order to reduce the number of times program code must be retrieved from bulk storage device 1010 during execution.

Input/output (I/O) devices depicted as input device 1012 and output device 1914 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers. A network adapter 1916 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

As pictured in FIG. 10, memory elements 1004 may store an application 1018. It should be appreciated that data processing system 1000 may further execute an operating system (not shown) that can facilitate execution of the application. Application, being implemented in the form of executable program code, can be executed by data processing system 1000, e.g., by processor 1002. Responsive to executing application, data processing system may be configured to perform one or more operations to be described herein in further detail.

In one aspect, for example, data processing system 1000 may represent a client data processing system. In that case, application 1018 may represent a client application that, when executed, configures data processing system 1000 to perform the various functions described herein with reference to a "client". Examples of a client can include, but are not limited to, a personal computer, a portable computer, a mobile phone, or the like.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer-implemented method of processing a multi-view video by a client apparatus, the multi-view video being created based on a set of video streams, which are generated by a set of cameras simultaneously capturing an object in a scene for a set of view angles, a view angle defining an angle between an optical axis of the camera focused onto the object and a reference axis of the object, the method comprising:
   receiving metadata, defining a plurality of windows for the multi-view video, a window defining multi-view video data associated with a subset of video streams selected from the set of video streams, the subset of video streams being associated with a subset of view angles, the view angles of the subset of view angles defining an ordered sequence of view angles;
   determining or receiving position information associated with an angular position of a viewer the angular position defining an angle between the reference axis of the object to be displayed by a multi-view display apparatus and an optical axis of the viewer looking towards the object;
   selecting a first window from the plurality of windows, the first window being associated with a first subset of view angles, the selecting being based on the position information and the first subset of view angles;
   requesting transmission of first multi-view video data associated with the first subset of video streams from a server system;
   receiving the first multi-view video data, and, providing the first multi-view video data to at least one decoder instance for decoding.

2. The method according to claim 1 wherein the first multi-view video data includes a sequence of encoded multi-view pictures, each multi-view picture including pictures associated with all view angles of the first subset of view angles.

3. The method according to claim 1 wherein the first multi-view video data includes groups of pictures, a group of pictures comprising pictures for all view angles of the first subset of view angles for a time instance.

4. The method according to claim 1 wherein each multi-view picture is associated with a packing format, the packing format defining how the pictures associated with the first subset of view angles are spatially arranged in the multi-view picture.

5. The method according to claim 1 wherein the method further includes:
   decoding the first multi-view video data into first decoded pictures associated with the first subset of view angles; and,
   providing the first decoded pictures to the multi-view display apparatus for simultaneously rendering at least part of the first decoded pictures to provide a holographic effect at the position of the viewer.

6. The method according to claim 1 wherein the position information is determined by or provided by a position sensor, which is configured to compute or predict the angular position of the viewer.

7. The method according to claim 6, wherein the position sensor includes an imaging system configured to track the position of the viewer in images captured by the imaging system.

8. The method according to claim 1 wherein selecting the first window from the plurality of windows includes:
   determining if the angular position of the viewer is located within a range defined by the smallest and the largest view angles of the first subset of view angles.

9. The method according to claim 1 wherein the ordered sequence of view angles defines an increasing or decreasing sequence of view angles, wherein a difference between two subsequent view angles defines a view spacing.

10. The method according to claim 9, wherein the view spacing of the different views is selected so that, during the rendering of the multi-view pictures, different visual information associated with different multiple view angles emanating from a screen point of the multi-view display apparatus enter the left and right eye of the viewer.

11. The method according to claim 10, wherein the first window is mapped to a first AdaptationSet, the EssentialProperty of the first AdaptationSet comprising the first window descriptor, the first AdaptationSet comprising Representations wherein each Representation defines one quality version of a video stream of the first subset of video streams.

12. The method according to claim 1 wherein the metadata further comprises first resource locators for locating the server system that is configured to transmit one or more resolution versions of the first subset of video streams to the client apparatus.

13. The method according to claim 1 wherein one window of the plurality of windows defines a second window, the second window defining a second subset of video streams selected from the set of video streams, the second subset of video streams being associated with a second subset of view angles wherein:
   view angles of the first subset partly overlap with the view angles of the second subset; or,
   view angles of the first subset do not overlap with the view angles of the second subset; or,
   view angles of the first subset are identical to the view angles of the second subset and the number of video streams of the first subset is larger than the number of video streams of the second subset.

14. The method according to claim 1 wherein the metadata includes at least one of:
   metadata defining that the first subset of view angles define: horizontal view angles for horizontal multi-view video rendering; vertical view angles for vertical multi-view video rendering; or, horizontal and vertical view angles for both horizontal and vertical multi-view video rendering;
   metadata defining a data format of the multi-view pictures;
   metadata defining an order in which pictures of different view angles are spatially arranged in the multi-view picture;
   metadata defining one or more properties of the set of cameras used to create the set of video streams;
   metadata defining the first angle of the first subset and/or the last angle of the first subset; and
   metadata defining the number of view angles in the first subset.

15. The method according claim 1 wherein the client apparatus is implemented as an HTTP adaptive streaming client apparatus, wherein the manifest file defines a Media Presentation Description, MPD, wherein the MPD includes a first windows descriptor defining the first window.

16. The method according to claim 15, wherein the client apparatus is a MPEG-DASH client apparatus, and wherein the first windows descriptor is an EssentialProperty.

17. A computer-readable medium comprising non-transitory data, the data comprising software code portions configured for, when run in the memory of a computer, executing the method steps according to claim 1.

18. The method according to claim 1, wherein the metadata is a manifest file.

19. The method according to claim 1, wherein the angular position is associated with the positions of eyes of the viewer.

20. A computer-implemented method of processing a multi-view video by a multi-view video authoring system, the method comprising:
  receiving a set of video streams defining a multi-view video, wherein the multi-view video is generated by a set of cameras simultaneously capturing an object in a scene for a set of view angles, a view angle defining an angle between an optical axis of the camera focused onto the object and a reference axis of the object;
  selecting a first subset and a second subset of video streams from the set of video streams, the first subset and the second subset of video streams being associated with a first subset of view angles and a second subset of view angles respectively;
  determining first multi-view video data associated with the first subset of video streams and second multi-view video data associated with the second subset of video streams;
  determining a manifest file, the manifest file defining a first window and a second window for the multi-view video, wherein the first window defines the first multi-view video data associated with the first subset of video streams and the first subset of view angles and the second window defines the second multi-view video data associated with the second subset of video data and the second subset of view angles; and,
  storing the first and the second multi-view video data and the manifest file on a storage medium.

21. The method of processing according to claim 20, wherein the determining first multi-view video data includes:
  spatially arrange pictures of all view angles of the first subset into multi-view pictures; and,
  encode the multi-view pictures based on a video coding process.

22. A client apparatus for processing multi-view video, the multi-view video being created based on a set of video streams, which are generated by a set of cameras simultaneously capturing an object in a scene for a set of view angles, a view angle defining an angle between an optical axis of the camera focused onto the object and a reference axis of the object, the client apparatus comprising:
  a computer readable storage medium having computer readable program code embodied therewith, and a processor, coupled to the computer readable storage medium, wherein responsive to executing the computer readable program code, the processor is configured to perform executable operations comprising:
  receiving metadata, defining a plurality of windows for the multi-view video, a window defining multi-view video data associated with a subset of video streams selected from the set of video streams, the subset of video streams being associated with a subset of view angles, the view angles of the subset of view angles defining an ordered sequence of view angles;
  determining or receiving position information associated with an angular position of a viewer, the angular position defining an angle between the reference axis of the object to be displayed by a multi-view display apparatus and an optical axis of the viewer looking towards the object;
  selecting a first window from the plurality of windows, the first window being associated with a first subset of view angles, the selecting being based on the position information and the first subset of view angles;
  requesting transmission of first multi-view video data associated with the first subset of video streams from a server system;
  receiving the first multi-view video data, and, providing the first multi-view video data to at least one decoder instance for decoding.

23. The client apparatus according to claim 22, wherein selecting the first window from the plurality of windows includes determining if the angular position of the viewer is located within a range defined by the smallest and the largest view angles of the first subset of view angles.

24. The client apparatus according to claim 22, wherein the metadata is a manifest file.

25. The client apparatus according to claim 22, wherein the angular position is associated with the positions of eyes of the viewer.

26. A multi-view video authoring system comprising:
  a computer readable storage medium having computer readable program code embodied therewith, and a processor, coupled to the computer readable storage medium, wherein responsive to executing the computer readable program code, the processor is configured to perform executable operations comprising:
  receiving a set of video streams defining a multi-view video, the multi-video being generated by a set of cameras simultaneously capturing an object in a scene for a set of view angles, a view angle defining an angle between an optical axis of the camera focused onto the object and a reference axis of the object;
  selecting a first subset and a second subset of video streams from the set of video streams, the first subset and the second subset of video streams being associated with a first subset of view angles and a second subset of view angles respectively;
  determining first multi-view video data associated with the first subset of video streams and the second multi-view video data associated with the second subset of video streams;
  determining a manifest file, the manifest file defining a first window and a second window for the multi-view video, wherein the first window defines the first multi-view video data associated with the first subset of video streams and the first subset of view angles and the second window defines the second multi-view video data associated with the second subset of video data and the second subset of view angles; and,
  storing the first and the second multi-view video data and the manifest file on a storage medium.

27. A server for processing multi-view video, the server comprising:
  a storage medium having multi-view video stored thereon, the multi-view video including
  first multi-view video data associated with a first subset of video streams and a first subset of view angles and second multi-view video data associated with a second subset of video streams and a second subset of view angles, the first multi-view video data defining a first window for the multi-view video and the second multi-view video data defining a second window for the multi-view video;

the first subset and the second subset of video streams being selected from a set of video streams, which are generated by a set of cameras simultaneously capturing an object in a scene for a set of view angles, a view angle defining an angle between an optical axis of the camera focused onto the object and a reference axis of the object;

the storage medium further having computer readable program code embodied therewith, and a processor, coupled to the computer readable storage medium, wherein responsive to executing the computer readable program code, the processor is configured to perform executable operations comprising:

receiving from a client apparatus a request for transmitting multi-view video data associated with at least one of the first and the second windows to the client apparatus; and, transmitting the at least one of the first and the second multi-view video data to the client apparatus.

\* \* \* \* \*